(12) United States Patent
Kim et al.

(10) Patent No.: US 11,917,124 B2
(45) Date of Patent: Feb. 27, 2024

(54) DISPLAY APPARATUS AND THE CONTROL METHOD THEREOF

(71) Applicant: Samsung Electronics Co., Ltd., Suwon-si (KR)

(72) Inventors: Daeyeong Kim, Suwon-si (KR); Jaesung Lee, Suwon-si (KR); Kyungmin Lim, Suwon-si (KR); Seyong Kwon, Suwon-si (KR); Sunil Lee, Suwon-si (KR); Kangwon Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/696,423

(22) Filed: Mar. 16, 2022

(65) Prior Publication Data
US 2022/0210397 A1    Jun. 30, 2022

Related U.S. Application Data

(63) Continuation of application No. PCT/KR2021/016847, filed on Nov. 17, 2021.

(30) Foreign Application Priority Data

Nov. 18, 2020 (KR) .................. 10-2020-0154762

(51) Int. Cl.
*H04N 13/398* (2018.01)
*H04N 13/125* (2018.01)
(Continued)

(52) U.S. Cl.
CPC ........... *H04N 13/398* (2018.05); *G02B 30/10* (2020.01); *H04N 13/125* (2018.05); *H04N 13/302* (2018.05)

(58) Field of Classification Search
CPC .. H04N 13/398; H04N 13/125; H04N 13/302; H04N 13/32; H04N 13/15;
(Continued)

(56) References Cited

U.S. PATENT DOCUMENTS 6,002,518 A * 12/1999 Faris .................... H04N 13/161
348/E13.058
8,848,006 B2    9/2014 Wetzstein et al.
(Continued)

FOREIGN PATENT DOCUMENTS

CN    109917549 A    6/2019
CN    110324605 B    11/2020
(Continued)

OTHER PUBLICATIONS

Takahashi et al., "From Focal Stack to Tensor Light-Field Display," IEEE Transactions on Image Processing, vol. 27, No. 9, pp. 4571-4584, Sep. 2018.
(Continued)

*Primary Examiner* — Tung T Vo
(74) *Attorney, Agent, or Firm* — Jefferson IP Law, LLP

(57) ABSTRACT

A display apparatus and a controlling method thereof are provided. The display apparatus includes a display comprising a first display panel, a lens array disposed on the first display panel, and a second display panel disposed on the lens array; and a processor to, based on a plurality of light field (LF) images, obtain a left (L) image and a right (R) image to drive the display by time-multiplexing, correct a second L image to drive the second display panel among the L images based on a first R image to drive the first display panel among the R images, and correct a second R image to drive the second display panel among the R images based on the first L image to drive the first display panel among the L images, and display a stereoscopic image by driving the
(Continued)

display by time-multiplexing based on the L image which includes the corrected second L image and the R image which includes the corrected second R image. The display apparatus of the disclosure may use an artificial intelligence model trained according to at least one of a rule-based model, a machine learning, a neural network, or a deep learning algorithm.

18 Claims, 15 Drawing Sheets

(51) Int. Cl.
*H04N 13/302* (2018.01)
*G02B 30/10* (2020.01)

(58) Field of Classification Search
CPC .......... G02B 30/10; G02B 3/00; G02B 30/27; G02B 3/005; G06N 3/08
USPC .......................................................... 348/51
See application file for complete search history.

(56) References Cited

U.S. PATENT DOCUMENTS

| | | | |
|---|---|---|---|
| 9,087,470 B2 | 7/2015 | Hur et al. | |
| 9,335,553 B2 | 5/2016 | Lanman et al. | |
| 9,343,020 B2 | 5/2016 | Heide et al. | |
| 9,866,825 B2 | 1/2018 | Baik et al. | |
| 9,936,192 B2 | 4/2018 | Park et al. | |
| 10,495,893 B2 | 12/2019 | Choi et al. | |
| 10,871,683 B2 | 12/2020 | Jung et al. | |
| 2009/0167639 A1* | 7/2009 | Casner | H04N 13/305 348/43 |
| 2011/0279451 A1* | 11/2011 | Haga | H04N 13/00 345/419 |
| 2012/0113153 A1* | 5/2012 | Casner | H04N 13/32 345/690 |
| 2012/0154463 A1 | 6/2012 | Hur et al. | |
| 2012/0299907 A1* | 11/2012 | Kim | G09G 3/3413 345/589 |
| 2016/0050409 A1 | 2/2016 | Park et al. | |
| 2016/0065954 A1* | 3/2016 | Son | G02B 30/52 348/51 |
| 2019/0082168 A1 | 3/2019 | Lee et al. | |
| 2020/0057492 A1 | 2/2020 | Yu et al. | |
| 2023/0214459 A1 | 7/2023 | Barnes et al. | |

FOREIGN PATENT DOCUMENTS

| | | |
|---|---|---|
| EP | 2 166 402 A2 | 3/2010 |
| JP | 2001-054142 A | 2/2001 |
| JP | 2019-083504 A | 5/2019 |
| JP | 2019-208214 A | 12/2019 |
| KR | 10-2012-0069432 A | 6/2012 |
| KR | 10-1661539 B1 | 9/2016 |
| KR | 10-2019-0081661 A | 7/2019 |
| KR | 10-2019-0124376 A | 11/2019 |
| KR | 10-2020-0082225 A | 7/2020 |
| KR | 10-2240568 B1 | 4/2021 |
| WO | 2017-065517 A1 | 4/2017 |
| WO | 2020/160024 A1 | 8/2020 |

OTHER PUBLICATIONS

Wetzstein et al., Tensor Displays: Compressive Light Field Synthesis using Multilayer Displays with Directional Backlighting, ACM Transactions on Graphics, vol. 31, No. 4, pp. 1-11, Jul. 1, 2012.
Chang et al., Crosstalk suppression by image processing in 3d display, 2010.
Extended European Search Report dated Nov. 20, 2023, issued in European Patent Application No. 21895089.7.

* cited by examiner

| VIEWPOINT | LEFT | RIGHT |
|---|---|---|
| STEREOSCOPIC IMAGE BEFORE CORRECTION (770) | 775-L<br>PSNR: 31.7497 | 775-R<br>PSNR: 32.2422 |
| STEREOSCOPIC IMAGE AFTER CORRECTION (780) | 785-L<br>PSNR: 39.2026 | 785-R<br>PSNR: 39.3431 |

DISPLAY APPARATUS AND THE CONTROL METHOD THEREOF

CROSS-REFERENCE TO RELATED APPLICATION(S)

This application is a continuation application, claiming priority under § 365(c), of an International application No. PCT/KR2021/016847, filed on Nov. 17, 2021, which is based on and claims the benefit of a Korean patent application number 10-2020-0154762, filed on Nov. 18, 2020, in the Korean Intellectual Property Office, the disclosure of which is incorporated by reference herein in its entirety.

BACKGROUND

1. Field

The disclosure relates to a display apparatus and a controlling method thereof. More particularly, the disclosure relates to a display apparatus displaying a stereoscopic image through a light field (LF) and a controlling method thereof.

2. Description of the Related Art

Recently, a display apparatus for displaying a three-dimensional stereoscopic image has been developed according to the development of an electronic technology.

A display apparatus for displaying a three-dimensional stereoscopic image may be classified into a glasses type which enables a user to watch a three-dimensional image only by wearing glasses, and a glassless method which enables a user to watch a stereoscopic image properly without wearing glasses. In the case of a glasses mode, a user may have a satisfactory three-dimensional effect, but there is a drawback that a user may feel inconvenient as a user should wear glasses (in particular, a user wearing glasses for sight correction, etc.), and that glasses are required as many as the number of users. In contrast, the glassless mode may provide convenience to a user in that the three-dimensional stereoscopic image may be viewed without glasses.

In particular, in a glassless mode, there is a light field (LF) scheme in which a display apparatus displays an image generated by using a plurality of light field image (LF) images captured at different viewpoints to reproduce a stereoscopic image. In the case of the LF scheme, unlike a general display apparatus, a stereoscopic image is displayed by changing the intensity and direction of light, and accordingly, a user may view the other angle of the object displayed on the display according to the viewpoint at which a user views the display.

The structure of the display apparatus for reproducing the LF scheme may be classified into an optical layer structure in which an optical layer such as a lens and a barrier is formed on a display panel to control the direction of light, and a stacked structure in which a plurality of display panels are vertically stacked to adjust the direction and intensity of light according to a combination of pixels between the display panels.

In the display apparatus having an optical layer structure, a phenomenon in which light travels in an undesired direction is generated according to the characteristics of the optical layer (e.g., refractive index, aberration, arrangement, etc.), so that the quality of the stereoscopic image is degraded, and a field of view at which a user may view is limited in a stacked structure display apparatus.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display apparatus capable of reducing crosstalk while improving field of view and a controlling method thereof.

Additional aspects will be set forth in part in the description which follows and, in part, will be apparent from the description, or may be learned by practice of the presented embodiments.

In accordance with an aspect, a display apparatus is provided. The display apparatus includes a display comprising a first display panel, a lens array disposed on the first display panel, and a second display panel disposed on the lens array; and a processor to, based on a plurality of light field (LF) images, obtain a left (L) image and a right (R) image to drive the display by time-multiplexing, correct a second L image to drive the second display panel among the L images based on a first R image to drive the first display panel among the R images, and correct a second R image to drive the second display panel among the R images based on the first L image to drive the first display panel among the L images, and display a stereoscopic image by driving the display by time-multiplexing based on display a stereoscopic image by driving the display by time-multiplexing based on the L image which includes the corrected second L image and the R image which includes the corrected second R image.

As an example, the processor may obtain an R crosstalk image based on the first R image and an L crosstalk image based on the first L image, and correct the second L image based on a pixel value of the R crosstalk image, and correct the second R image based on a pixel value of the L crosstalk image.

As an example, the processor may correct the second L image to have a pixel value reduced as much as a pixel value of the R crosstalk image with respect to a pixel of a same position, and correct the second R image to have a pixel value reduced as much as a pixel value of the L crosstalk image with respect to a pixel of a same position.

As an example, processor may obtain the R crosstalk image having a pixel value obtained by multiplying a crosstalk ratio by the pixel value of the first R image, and obtain the L crosstalk image having a pixel value obtained by multiplying the crosstalk ratio by the pixel value of the first L image.

As an example, the processor may obtain a third R image in which the first R image and the second R image are synthesized and obtain the R crosstalk image having a pixel value by multiplying the crosstalk ratio by the pixel value of the synthesized third R image, and obtain a third L image in which the first L image and the second L image are synthesized and obtain the L crosstalk image having a pixel value obtained by multiplying the crosstalk ratio by the pixel value of the synthesized third L image.

As an example, the processor may, based on information of a viewpoint at which the plurality of LF images are captured, extract an LF image representing a left viewpoint and an LF image representing a right viewpoint among the plurality of LF images, obtain the L image by inputting the LF image representing the left viewpoint to a first factorization model trained to output the L image corresponding to a number of the first display panel and the second display panel, and obtain the R image by inputting the LF image representing the right viewpoint to a second factorization model trained to output the R image corresponding to a number of the first display panel and the second display panel.

As an example, the first factorization model may be an artificial intelligence model trained until a loss function based on an LF image representing a left viewpoint and an LF image restored through the L image becomes less than or equal to a predetermined value, and the second factorization model may be an artificial intelligence model trained until a loss function based on an LF image representing a right point of view and an LF image restored through the R image becomes less than or equal to a predetermined value.

As an example, each of the first factorization model and the second factorization model may be one of a deep neural network (DNN) model, a non-negative tensor factorization (NTF) model, or a non-negative matrix factorization (NMF) model.

As an example, the lens array may include a unit lens disposed on an even number of sub-pixels of the first display panel.

As an example, the processor may, based on the LF image which are classified according to the viewpoint at which the plurality of LF images are captured, obtain the L image, the M image, and the R image corresponding to the viewpoint, correct the second L image based on the first M image and the first R image for driving the first display panel among the M images, correct the second R image based on the first M image and the first L image, based on the first L image and the first R image, correct a second M image for driving the second display panel among the M images, and display the stereoscopic image by driving the display by time-multiplexing based on the L image which includes the corrected second L image, the M image which includes the corrected second M image, and the R image which includes the corrected second R image.

In accordance with another aspect of the disclosure, a controlling method of a display apparatus is provided. The controlling method includes, based on a plurality of light field (LF) images, obtaining a left (L) image and a right (R) image to drive the display comprising a first display panel, a lens array disposed on the first display panel, and a second display panel disposed on the lens array by time-multiplexing; correcting a second L image to drive the second display panel among the L images based on a first R image to drive the first display panel among the R images, and correct a second R image to drive the second display panel among the R images based on the first L image to drive the first display panel among the L images; and displaying a stereoscopic image by driving the display by time-multiplexing based on the L image which includes the corrected second L image and the R image which includes the corrected second R image.

As an example, the correcting may include obtaining an R crosstalk image based on the first R image and an L crosstalk image based on the first L image; and correcting the second L image based on a pixel value of the R crosstalk image, and correcting the second R image based on a pixel value of the L crosstalk image.

As an example, the correcting may include correcting the second L image to have a pixel value reduced as much as a pixel value of the R crosstalk image with respect to a pixel of a same position, and correcting the second R image to have a pixel value reduced as much as a pixel value of the L crosstalk image with respect to a pixel of a same position.

As an example, the obtaining the R crosstalk image and the L crosstalk image may include obtaining the R crosstalk image having a pixel value obtained by multiplying a crosstalk ratio by the pixel value of the first R image, and obtaining the L crosstalk image having a pixel value obtained by multiplying the crosstalk ratio by the pixel value of the first L image.

As an example, the obtaining the R crosstalk image and the L crosstalk image may include obtaining a third R image in which the first R image and the second R image are synthesized and obtain the R crosstalk image having a pixel value by multiplying the crosstalk ratio by the pixel value of the synthesized third R image, and obtaining a third L image in which the first L image and the second L image are synthesized and obtain the L crosstalk image having a pixel value obtained by multiplying the crosstalk ratio by the pixel value of the synthesized third L image.

As an example, the obtaining the L image and the R image may include, based on information of a viewpoint at which the plurality of LF images are captured, extracting an LF image representing a left viewpoint and an LF image representing a right viewpoint among the plurality of LF images, obtaining the L image by inputting the LF image representing the left viewpoint to a first factorization model trained to output the L image corresponding to a number of the first display panel and the second display panel, and obtaining the R image by inputting the LF image representing the right viewpoint to a second factorization model trained to output the R image corresponding to a number of the first display panel and the second display panel.

As an example, the first factorization model may be an artificial intelligence model trained until a loss function based on an LF image representing a left viewpoint and an LF image restored through the L image becomes less than or equal to a predetermined value, and the second factorization model may be an artificial intelligence model trained until a loss function based on an LF image representing a right point of view and an LF image restored through the R image becomes less than or equal to a predetermined value.

As an example, each of the first factorization model and the second factorization model is one of a deep neural network (DNN) model, a non-negative tensor factorization (NTF) model, or a non-negative matrix factorization (NMF) model.

As an example, the lens array may include a unit lens disposed on an even number of sub-pixels of the first display panel.

As an example, the obtaining the L image and the R image may include, based on the LF image in which the plurality of LF images are classified according to a viewpoint, obtaining the L image, the M image, and the R image corresponding to the viewpoint. The correcting may include correcting the second L image based on the first M image and the first R image for driving the first display panel among the M images, correcting the second R image based on the first M image and the first L image, based on the first L image and the first R image, and correcting a second M image for driving the second display panel among the M images. The displaying a stereoscopic image may include displaying the stereoscopic image by driving the display by time-multiplexing based on the L image by correcting the second L image, the M image by correcting the second M image, and the R image by correcting the second R image.

As an example, the plurality of LF images representing the left viewpoint are restored on the basis of the first L image and the second L image included in the L image.

As an example, the restored LF image is an LF image that is viewed at an external specific viewpoint when a first display panel displays the first L image and a second display panel displays the second L image through an actual image or a virtual simulation.

As an example, a shifting parameter of an image displayed on each of the first display panel and the second display panel is mapped for each viewpoint.

According to various embodiments of the disclosure, it is possible to provide a display apparatus capable of reducing crosstalk while improving a field of view, and a controlling method thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A and 7B are views for comparing images before and after correction according to various embodiments of the disclosure;

Throughout the drawings, it should be noted that like reference numbers are used to depict the same or similar elements, features, and structures.

DETAILED DESCRIPTION

Figure 1:
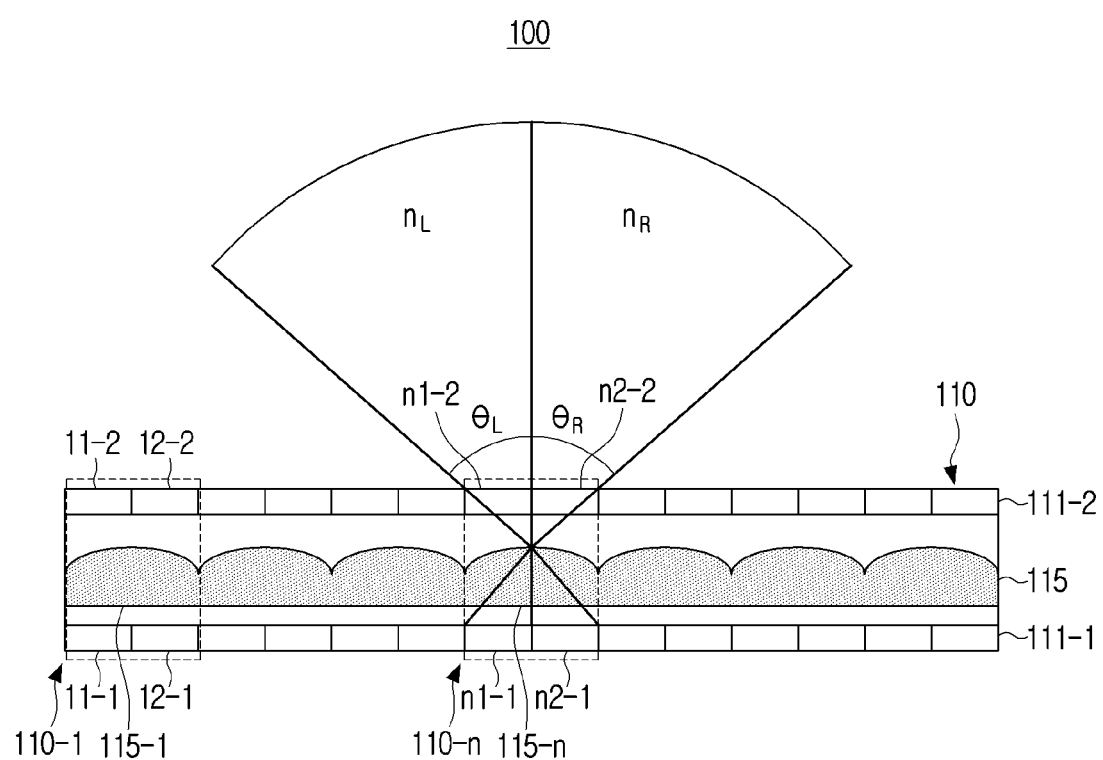
FIG. 1 is a cross-sectional view illustrating a structure of a display apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements throughout.

Terms such as "first" and "second" used in various example embodiments may modify various elements regardless of an order and/or importance of the corresponding elements. These terms may be used to distinguish one element from another and do not limit the corresponding elements.

In the description, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the other element.

FIG. 1 is a cross-sectional view illustrating a structure of a display apparatus according to an embodiment of the disclosure.

Referring to FIG. 1, a display apparatus 100 according to an embodiment may include a display 110. The display apparatus 100 may be implemented in various forms such as a TV, a monitor, a smartphone, a portable multimedia device, a portable communication device, a smart glass, a smart window, a smart watch, a head-mount display (HMD), a wearable device, a portable device, a handheld device, a signage, an electronic display, an advertisement board, a cinema screen, a video wall, etc., but is not limited thereto.

The display 110 may display a stereoscopic image implemented by a Light Field (LF) by using a plurality of LF (Light Field) images. The plurality of LF images refer to images in which light emitted from a specific object is captured at a plurality of viewpoints that are different from each other. The stereoscopic image of the disclosure refers to an image that allows another surface of an object to appear to a user according to a viewpoint (or location of a user) of a user. For example, when a user looking at the display 110 moves the position to the left, more left portions of the object may appear to the user in the stereoscopic image.

The display 110 may include a first display panel 111-1 and a second display panel 111-2. Each of the first display panel 111-1 and the second display panel 111-2 may be driven to display an individual image.

The first display panel 111-1 and the second display panel 111-2 may be disposed in a stacked structure. For example, the first display panel 111-1 may be disposed in a lower portion (or a rear direction) than the second display panel 111-2 as a first layer, and the second display panel 111-2 may be disposed in a higher portion (or a front direction) than the first display panel 111-1 as a second layer. This is to reproduce a stereoscopic image implemented as an LF through a combination of images displayed on each of the first display panel 111-1 and the second display panel 111-2.

Each of the first display panel 111-1 and the second display panel 111-2 may include a plurality of sub-pixels. The sub-pixel may be one of a red (R) color sub-pixel, a green (G) color sub-pixel, and a blue (B) color sub-pixel, and may adjust the amount of emitted light or incident light. The R sub-pixels, the G sub-pixels, and the B sub-pixels located at adjacent distances may constitute one pixel.

For example, as shown in FIG. 1, the first display panel 111-1 may include a plurality of sub-pixels 11-1, 12-1, . . . n1-1, n2-1 . . . , and the second display panel 111-1 may include a plurality of sub-pixels 11-2, 12-2, . . . n1-2, n2-2, . . . . The disclosure may include a plurality of memory cells. The light emitted from the sub-pixels 11-1, 12-1, . . . n1-1, n2-1 . . . , of the first display panel 111-1 may be discharged to outside of the display 110 through the sub-pixels 11-2, 12-2, . . . n1-2, n2-2 . . . of the second display panel 111-2. In this case, the light discharged to the outside may be visible to a user located within a predetermined angle (i.e., field of view) based on the sub-pixels 11-1, 12-1, . . . n1-1, n2-1, . . . .

The first display panel 111-1 and the second display panel 111-2 may display images in various ways. For example, each of the first display panel 111-1 and the second display panel 111-2 may be composed of a liquid crystal display (LCD) panel that controls an arrangement of an LCD, thereby controlling the amount of passing of light (i.e., transmittance). In this case, the display 110 may include a back light unit (BLU). The backlight unit may be disposed in a lower portion (or a rear direction) of the LCD panel to generate light provided to the LCD panel. The backlight unit may include a light emitter such as a cold cathode fluorescent lamp (CCFL), light emitting diode (LED) for generating light and a light guide plate for uniformly distributing the generated light to the display 110. For another example, each of the first display panel 111-1 and the second display panel 111-2 may be implemented as an LED panel including a light-emitting element (e.g., an organic light emitting diode (OLED), a micro LED, mini LED, quantum dot LED (QLED), etc.) which controls the degree of light emission by controlling the recombination of electrons and holes.

The display 110 according to an embodiment of the disclosure may include a lens array 115. The lens array 115 may refract the light emitted from the sub-pixel, and extend a field of view for observing light.

The lens array 115 may be disposed on the first display panel 111-1. The second display panel 111-2 may be disposed on the lens array 115. The lens array 115 may be disposed on the first display panel 111-1 located at the rear surface of the plurality of display panels 111-1 and 111-2, relatively. The plurality of sub-pixels 11-1, 12-1, . . . n1-1, n2-1, . . . and the plurality of sub-pixels 11-2, 12-2, . . . n1-2, n2-2 . . . may be disposed to face each other. Lights emitted from each of the sub-pixels 11-2, 12-2, . . . n1-2, n2-2 . . . . May be discharged to the outside through at least one of the plurality of sub-pixels 11-2, 12-2, . . . n1-2, n2-2 . . . .

The lens array 115 includes a plurality of unit lenses 115-1, . . . , 115-n, . . . . The unit lenses 115-1, . . . , 115-n refer to an optical element for refracting light and changing the direction of propagation of the light. The unit lens 115-1, . . . , 115-n . . . may have various shapes such as a semi-cylindrical shape, a hemispherical shape, etc., and may be formed of various materials such as glass, plastic resin, polyimide, etc. having transparent properties.

The lens array 115 may be disposed on the first display panel 111-1 so that each unit lens 115-1 . . . 115-n . . . may be disposed on the plurality of sub-pixels 11-1, 12-1 . . . n1-1, n2-1 . . . of the first display panel 111-1. That is, a plurality of unit lenses may be formed on the first display panel 111-1 so that one unit lens covers a plurality of sub-pixels of the first display panel 111-1. For example, one unit lens (e.g., 115-n) may cover the even number of sub-pixels (e.g., n1-1, n2-1) of the first display panel 111-1.

The display 110 may be divided into a plurality of unit regions 110-1, . . . , 110-n, . . . . Taking an example of one unit region, the nth unit region 110-n may include a plurality of sub-pixels n1-1 and n2-1 of the first display panel 111-1, a unit lens 115-n of the lens array 115, and a plurality of sub-pixels n1-2 and n2-2 of the second display panel 111-2.

The light discharged from the sub-pixel (e.g., n1-1) of the first display panel 111-1 may be refracted by a unit lens (e.g., 115-n) covering the unit lens (e.g., 115-n) (that is, the unit lens (e.g., 115-n) covering the sub-pixel (e.g., n1-1) located within the same unit region (e.g., 110-n) among a plurality of unit lenses 115-1, . . . 115-n . . . of the lens array 115. In this example, the refracted light may be emitted (or radiated) to the outside through one sub-pixel (e.g., n2-2) among a plurality of sub-pixels 11-2, 12-2, . . . n1-2, n2-2 . . . of the second display panel 111-2 according to the distance between the first and second display panels 111-1 and 111-2 and the propagation direction (or angle) of the light. The propagation direction (or angle) of the light may be determined according to the characteristics of the unit lens (e.g., refractive index, aberration, arrangement, etc.).

For example, the light emitted from the sub-pixels (e.g., n1-1) of the first display panel 111-1 may be refracted by a unit lens (e.g., 115-n), and the refracted light may be emitted to the outside through a sub-pixel (e.g., n2-2) of the second display panel 111-2. In this example, the light emitted to the outside may propagate in the direction of the right field of view (e.g., θR, e.g., 0° to +30°), and may be visible to the user located in the right field of view region (nR) corresponding to the right field of view (e.g., θR).

In a similar manner, the light emitted from the sub-pixels (e.g., n1-2) of the first display panel 111-1 is refracted by a unit lens (e.g., 115-*n*), and the refracted light may be emitted to the outside through a sub-pixel (e.g., n2-2) of the second display panel 111-2. The light emitted to the outside may propagate in a direction within the range of the left field of view (θL, e.g., −30 degrees to 0 degrees), and may be visible to a user located in the left field of view region corresponding to the left field of view (θL).

The lens array 115 described above is only one embodiment, and may be replaced with a barrier layer instead of the lens array 115. The barrier layer may be disposed parallel to the first display panel 111-1 on the first display panel 111-1. In the barrier layer, a region in which light may be transmitted at regular intervals and a region in which light may be blocked may be alternately formed. The barrier layer may transmit light emitted from the sub-pixels of the first display panel 111-1 to transfer the light to a specific sub-pixel of the second display panel 111-2, or block light emitted from the sub-pixels of the first display panel 111-1 to prevent the light emitted from the sub-pixels of the first display panel 111-1 from being transmitted to a particular sub-pixel of the second display panel 111-2. The barrier layer may be variously modified, and may be disposed in parallel with the second display panel 111-2 on the second display panel 111-2.

The display apparatus 100 according to an embodiment may display a stereoscopic image through a time-multiplexing operation. This will be described with reference to FIGS. 2A and 2B.

Figure 2A:
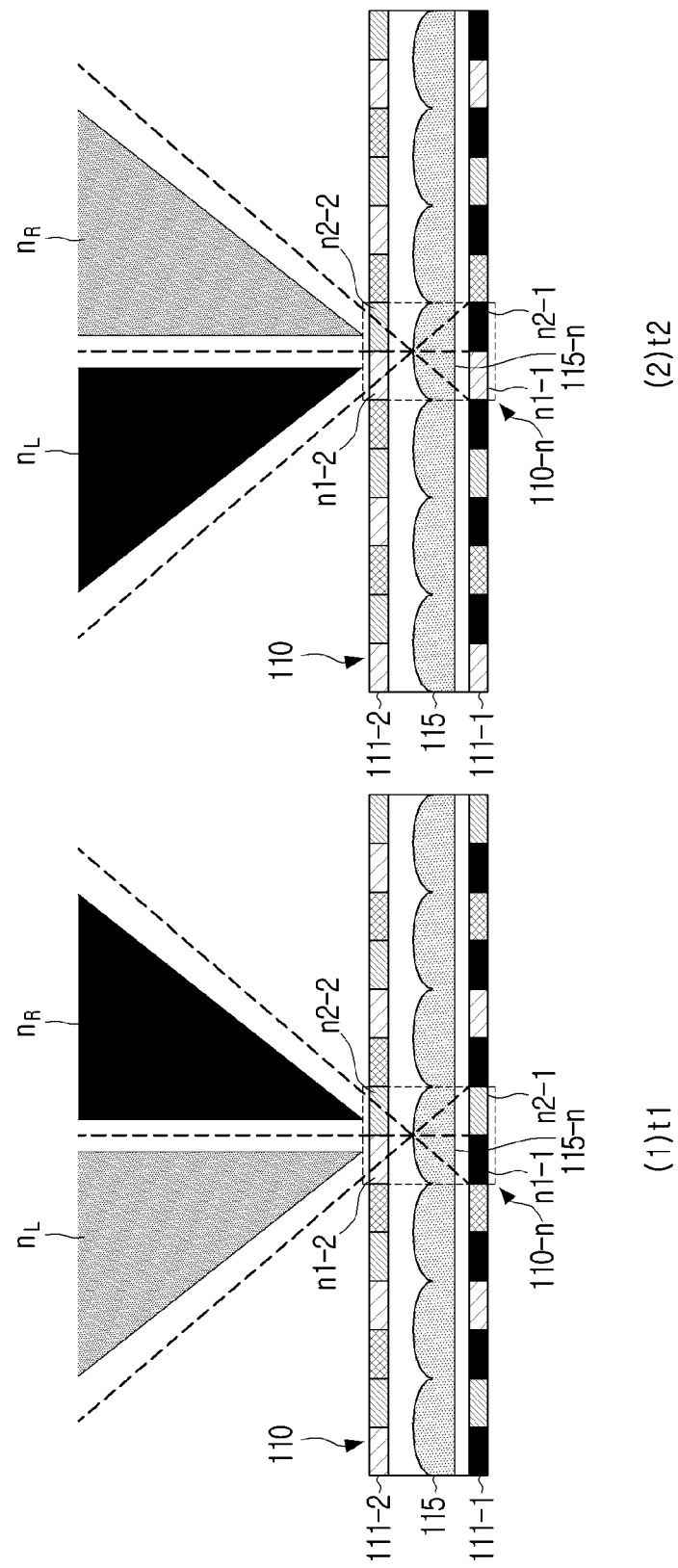
FIG. 2A is a diagram illustrating a time-multiplexing operation of a display apparatus according to an embodiment of the disclosure.

FIG. 2A is a diagram illustrating time-multiplexing of a display apparatus according to an embodiment of the disclosure.

Referring to FIG. 2A, the display 110 according to an embodiment may display a stereoscopic image through time-multiplexing operation.

The time-multiplexing operation indicates that the display 110 displays images of different viewpoints alternately according to time. For example, the display 110 may display an image (e.g., an L image) of a first viewpoint at a first time t1, and may display a second viewpoint image (e.g., R image) at a second time t2 in which a predetermined time (e.g., 5 ms, etc.) has elapsed from the first time t1. The display 110 may display a first viewpoint image (e.g., an L image) at a third time t3 in which a predetermined time (e.g., 5 ms, etc.) has elapsed from the second time t2, and may display an image of the second viewpoint (e.g., R image) at a fourth time t4, in which a predetermined time (e.g., 5 ms, etc.) has elapsed from the third time t3. The image displayed on the display 110 may be sequentially iterated such as an image of a first viewpoint, an image of a second viewpoint, an image of a first viewpoint, an image of a second viewpoint, or the like.

The display 110 may display an L image representing the left viewpoint of the object at time t1. The display 110 may then display an R image representing the right viewpoint of the object at time t2.

Hereinafter, the L image and the R image will be described.

The L image may include a first L image for displaying on the first display panel 111-1 and a second L image for displaying on the second display panel 111-2 at time t1. Each of the first L image and the first R image may be mapped to a pixel value (e.g., a value between 0 and 255) for R, G, and B colors for each pixel position of the first display panel 111-1. The R image may include a first R image for displaying on the first display panel 111-1 and a second R image for displaying on the second display panel 111-2 at a time t2. Each of the second L image and the second R image may be mapped to a pixel value (e.g., a value between 0 and 255) for R, G, and B colors for each pixel position of the second display panel 111-2.

More specifically, time-multiplexing operation of the sub-pixels of the display 110 at t1 and t2 will be described based on a unit region (e.g., 110-*n*). First, a first L image and a first R image displayed on the first display panel 111-1 may be mapped with a pixel value as shown in Table 1.

TABLE 1

| Sub-pixel of the first display panel 111-1 | Pixel value of the first L image (time t1) | Pixel value of the first R image (time t2) |
| --- | --- | --- |
| First sub-pixel n1-1 | Black (e.g.: value of 0) | Right viewpoint of an object (e.g.: value between 0~255) |
| Second sub-pixel n2-1 | Left viewpoint of the object (e.g.: value between 0~255) | Black (e.g.: value of 0) |

Referring to part (1) of FIG. 2A, the first L image may be mapped to a pixel value (e.g., 0) representing a black color in regard to a first sub-pixel (e.g., n1-1) of the first display panel 111-1, and may be mapped to a pixel value (e.g., a value between 0 and 255) representing a color of an object of a left viewpoint in regard to a second sub-pixel (e.g., n2-1) of the first display panel 111-1. Referring to part (2) of FIG. 2A, the first R image may be mapped to a pixel value (e.g., a value between 0 and 255) representing a right viewpoint of an object in regard to a first sub-pixel (e.g., n1-1) of the first display panel 111-1, and may be mapped a pixel value (e.g., 0) representing a black color in regard to a second sub-pixel (e.g., n2-1) of the first display panel 111-1. Hereinafter, the operation of the display panels 111-1 and 111-2 will be described. The first display panel 111-1 may display the first L image at time t1, and the second display panel 111-2 may display the second L image at time t1. The second sub-pixel (e.g., n2-1) of the first display panel 111-1 may drive to emit light of brightness corresponding to a pixel value (e.g., a value between 0 and 255) of the first L image at time t1. The first sub-pixel (e.g., n1-2) of the second display panel 111-2 may be driven to emit light of brightness corresponding to a pixel value (e.g., a value between 0 and 255) of the second L image at time t1. The light emitted from the second sub-pixel (e.g., n2-1) of the first display panel 111-1 may be emitted through the first sub-pixel (e.g., n1-2) of the second display panel 111-2 to the left field of view region nL. In this case, a user located in the left field of view region nL may observe a stereoscopic image representing a left viewpoint of an object according to a combination of the first L image and the second L image.

The first sub-pixel (e.g., n1-1) of the first display panel 111-1 may be driven not to emit light according to a pixel value (e.g., a value representing a black color) of the first L image at time t1. The user located in the right field of view region nR may not observe the first L image.

In the case of time t2, the first sub-pixel (e.g., n1-1) of the first display panel 111-1 may be driven to emit light of brightness corresponding to a pixel value (e.g., a value between 0 and 255) of the first R image at time t2. The second sub-pixel (e.g., n2-2) of the second display panel 111-2 may be driven to emit light of brightness corresponding to a pixel value (e.g., a value between 0 and 255) of the second R image at time t2. The light emitted from the first sub-pixel (e.g., n1-1) of the first display panel 111-1 may be emitted through the second sub-pixel (e.g., n2-2) of the second display panel 111-2 to the right field of view region (e.g., nR). The user located in the right field of view region (e.g., nR) may observe a stereoscopic image representing a right viewpoint of an object according to a combination of the first R image and the second R image.

The second sub-pixel (e.g., n2-1) of the first display panel 111-1 may be driven not to emit light according to a pixel value (e.g., a value of 0) of the first R image at time t2. The user located in the left field of view region (e.g., nL) may not observe the first R image.

As described above, the display apparatus 100 of the disclosure may represent a stereoscopic image in which a viewpoint is extended left and right through the time-multiplexing operation.

According to an embodiment of the disclosure, a crosstalk may occur when the display 110 displays an L image and an R image through the time-multiplexing operation. The crosstalk will be described in detail with reference to FIG. 2B.

Figure 2B:
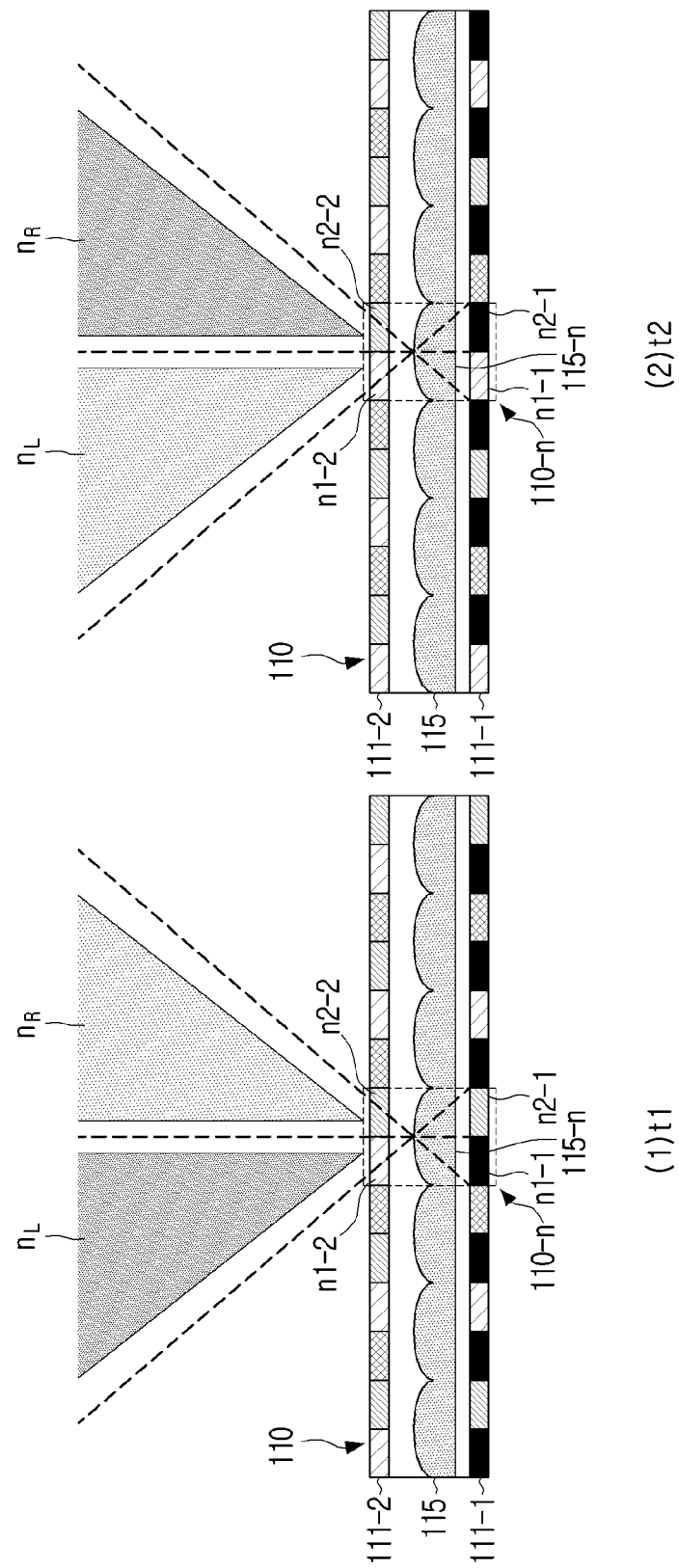
FIG. 2B is a diagram illustrating a crosstalk according to an embodiment of the disclosure.

FIG. 2B is a diagram illustrating a crosstalk according to an embodiment of the disclosure.

Referring to FIG. 2A, the first display panel 110-1 may display a first L image representing the left viewpoint of the object at time t1. The first display panel 111-1 may drive so that the second sub-pixel (e.g., n2-1) of the first display panel 111-1 emits light of a brightness corresponding to a pixel value (e.g., a value between 0 and 255) of the first display panel 111-1, and the first sub-pixel (e.g., n1-1) of the first display panel 111-1 does not emit light according to a pixel value (e.g., a value of 0), according to a pixel value of a color mapped to the pixel of the first L image at time t1.

Referring to part (1) of FIG. 2B, light emitted from the second sub-pixel (e.g., n2-1) of the first display panel 111-1 located around the first sub-pixel (e.g., n1-1) of the first display panel 111-1 may be refracted by a unit lens (e.g., 115-n).

A portion of the refracted light may be emitted through the first sub-pixel n1-2 of the second display panel 111-2 to the left field of view region (e.g., nL). A portion of the refracted light may be emitted to the right viewing-angle region (e.g., nR) through the second sub-pixel n2-2 of the second display panel 111-2. The image representing the left viewpoint of the object at time t1 may be observed to the user located in the right field of view region (e.g., nR) as well as the user located in the left field of view region (e.g., nL).

The display 110 may display an R image representing the right viewpoint of the object at time t2. The first display panel 111-1 may drive so that the first sub-pixel (e.g.: n1-1) of the first display panel 111-1 emits light corresponding to a pixel value (e.g., a value between 0 and 255) of the first sub-pixel (e.g., n1-1) according to the pixel value of the color mapped to the pixel of the first R image at t2, and may drive so that the second sub-pixel (e.g., n2-1) of the first display panel 111-1 does not emit light according to the pixel value (e.g.: value of 0).

Referring to part (2) of FIG. 2B, light emitted from the first sub-pixel (e.g., n1-1) of the first display panel 111-1 located around the second sub-pixel (e.g., n2-1) of the first display panel 111-1 may be refracted by a unit lens (e.g., 115-n).

A portion of the refracted light may be emitted through the second sub-pixel n2-2 of the second display panel 111-2 to the right field of view region (e.g., nR). A portion of the refracted light may be emitted through the first sub-pixel n1-2 of the second display panel 111-2 to the left field of view region (for example, nL). The image representing the right viewpoint of the object at time t2 may be observed by the user located in the left field of view region (e.g., nL) as well as the user located in the right field of view region (e.g., nR).

As described above, a phenomenon that the light (image representing a left viewpoint of the object) emitted from the second sub-pixel (e.g., n2-1) of the first display panel 111-1 at t1 is emitted to the right field of view region (e.g., nR), or the light (image representing the right viewpoint of the object) emitted from the first sub-pixel (e.g., n1-1) of the first display panel 111-1 at t2 is emitted to the left field of view region (e.g., nL) may be defined as a crosstalk. The crosstalk may refer to a phenomenon in which light representing an image of another viewpoint that is not intended at a specific time and a specific region is leaked. Such crosstalk may result in distortion or artifact of the stereoscopic image. When a crosstalk occurs, an image of another viewpoint may be defined as a crosstalk image.

The crosstalk may occur according to the characteristics of the first display panel 111-1 and the characteristics of the lens array 115. For example, the characteristics of the first display panel 111-1 and the characteristics of the lens array 115 may include various characteristics such as the size of the sub-pixel (or pixel) of the first display panel 111-1, the pitch of the unit lens of the lens array 115, the aberration of the unit lens, the focal length of the unit lens, the alignment relation between the sub-pixel and the unit lens (for example, if the alignment does not match), or the like. The above phenomenon may occur due to various factors such as when a phase is not exactly gathered at one point due to the aberration of the lens, when the subpixel (or pixel) is not precisely located in the focal length of the lens, or when subpixels (or pixels) are not accurately located in one lens as many as the number of integer times, or the like.

The occurring degree of crosstalk may be expressed through the crosstalk ratio. For example, the crosstalk ratio may be defined at a ratio of the brightness of the image displayed in the left field of view region (e.g., nL) at time t1 and the brightness of the crosstalk image displayed in the right field of view region (e.g., nR), and the crosstalk ratio may have a value between 0 and 1. The ratio of the crosstalk may be defined as the ratio of the brightness of the image displayed in the right field of view region (e.g., nR) and the brightness of the crosstalk image displayed in the left field of view region (e.g., nL) at time t2.

The display apparatus 100 according to an embodiment of the disclosure may reduce distortion or artifacts of a stereoscopic image through image correction using a crosstalk ratio. The detailed description will be described with reference to the accompanying drawings.

Figure 3:
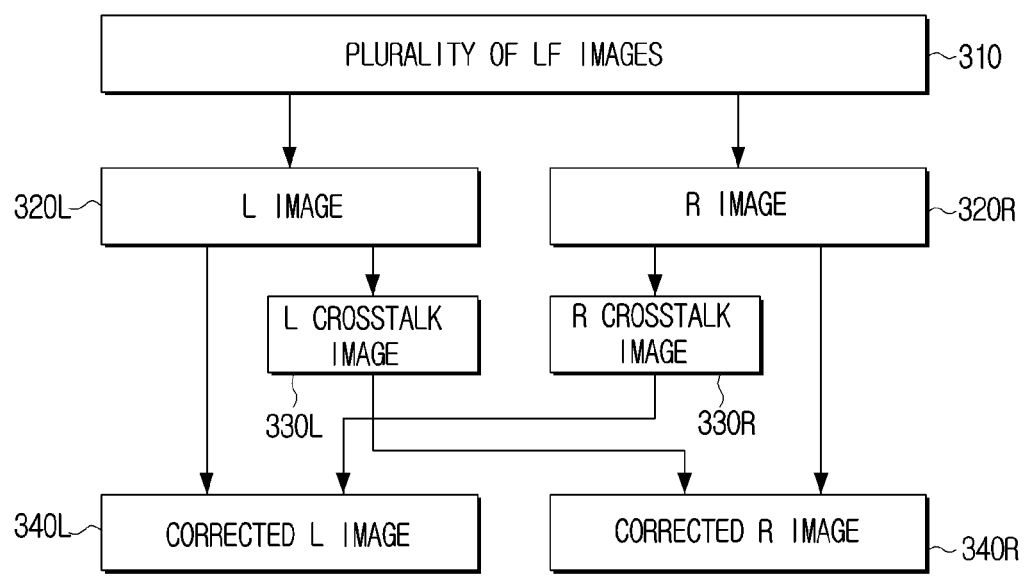
FIG. 3 is a diagram illustrating a method for obtaining a corrected image by using a plurality of LF images according to an embodiment of the disclosure.

FIG. 3 is a diagram illustrating a method for obtaining a corrected image by using a plurality of LF images by the display apparatus according to an embodiment of the disclosure.

Referring to FIG. 3, the display apparatus 100 may obtain an L image 320L and an R image 320R for driving the display 110 by time-multiplexing based on a plurality of LF images 310.

The L image 320L includes a first L image for driving the first display panel 111-1 and a second L image for driving the second display panel 111-2, and the R image 320R may include the first R image for driving the first display panel 111-1 and the second R image for driving the second display panel 111-2. The L image 320L may include the same number of images as the number of the display panel 111, and the R image 320 R may include the same number of images as the number of the display panel 111. More specifically, the details will be described with reference to FIG. 4.

The display apparatus 100 may correct a second L image to drive the second display panel 111-2 among the L image 320L based on a first R image to drive the first display panel 111-1 among the R image 320R. The display apparatus 100 may correct the second R image to drive the second display panel 111-2 among the R image 320R based on a first L image to drive the first display panel 111-1 among the L image 320L.

This is to compensate for the brightness of the crosstalk image in the original image to reduce artifacts when the crosstalk occurs. According to the disclosure, there is an advantage of reducing costs, reducing power, reducing volume and thickness, and improving light extraction efficiency in that there is no need for a separate structure capable of shielding light in units of pixels, compared to a physical method for blocking light leaking to the outside according to the generation of crosstalk.

According to an embodiment of the disclosure, the display apparatus 100 may obtain an R crosstalk image 330R using a first R image of the R image 320 R, and may correct a second L image of the L image 320L using the obtained R crosstalk image 330 R. In addition, the display apparatus 100 may obtain the L crosstalk image 330L using the first L image among the L image 320L, and may correct the second R image among the R image 320 R using the obtained L crosstalk image 330L. More specific details will be described with reference to FIGS. 5A to 5C.

The display apparatus 100 may display a stereoscopic image by driving the display 110 by time-multiplexing on the basis of the L image 340L in which the second L image is corrected and the R image 340R in which the second R image is corrected. This will be described in detail with reference to FIG. 6.

Figure 4:
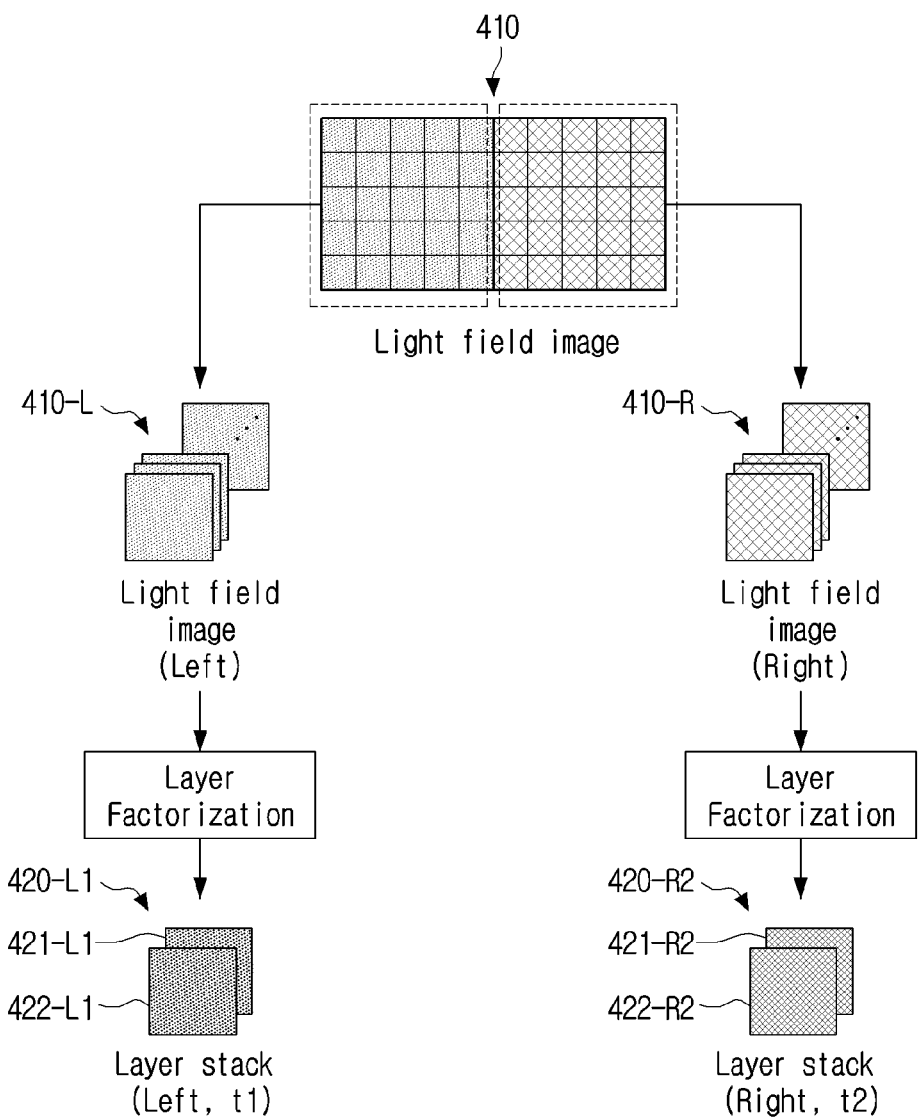
FIG. 4 is a diagram illustrating a method of obtaining an L image and an R image according to an embodiment of the disclosure.

FIG. 4 is a diagram illustrating a method of obtaining an L image and an R image according to an embodiment of the disclosure.

Referring to FIG. 4, the display apparatus 100 may obtain a plurality of light field (LF) images 410. A plurality of light field (LF) images 410 correspond to a source image.

The plurality of LF images 410 may be obtained through an LF camera. The LF camera refers to a device including a plurality of unit lenses for capturing an object at different viewpoints (or positions). The LF camera may be included in the display apparatus 100, or may be implemented as an external device separate from the display apparatus 100. The plurality of LF images 410 obtained through the LF camera may be stored in a memory of the display apparatus 100 or a memory of an external device. The display apparatus 100 may access a plurality of LF images 410 stored in a memory of the display apparatus 100, or may receive a plurality of LF images 410 from an external device to obtain a plurality of LF images 410.

Each of the plurality of LF images 410 may include information about a captured viewpoint. Each of the plurality of LF images 410 is an image obtained by capturing an object with different viewpoints by an LF camera. Each image may include a plurality of pixels, and each pixel may be mapped to a pixel value for R, G, and B colors. For example, when the LF camera is composed of a unit lens having an array shape of 10×5, a plurality of LF images 410 captured by the LF camera may have an array shape of 10×5. The positions (e.g., (1,1), (1,2), etc.) in which each of the plurality of LF images 410 are arranged may represent a viewpoint in which the corresponding LF image is captured.

The plurality of LF images 410 may be still images or moving images. If the plurality of LF images 410 are moving images, the plurality of LF images 410 may include information about a captured time or frame per second (FPS). FPS refers to a speed at which a sequential image is captured or reproduced. For example, when the LF camera captures at 30 FPS, a plurality of LF image 1, a plurality of LF images 2, . . . , a plurality of LF images 30 may be sequentially obtained during 1 second. Thereafter, when the display 110 displays a plurality of LF images of 30 FPS, L image 1 and R image 1 obtained using a plurality of LF image 1, L image 2 and R image 2 obtained by using a plurality of LF image 2, . . . , L image 30 and R image 30 obtained by using the plurality of LF images 30 may be sequentially displayed. For convenience of description, it will be described that the plurality of LF images 410 are assumed to be set as a set of images captured at the same time by the LF camera.

The display apparatus 100 may obtain an L image 420-L1 and an R image 420-R2 for driving the display 110 by time-multiplexing based on a plurality of light field (LF) images 410. The L image 420-L1 may include a first L image 421-L1 and a second L image 422-L1, and an R image 410-R2 may include a first R image 421-R2 and a second R image 422-R2.

The display apparatus 100 may divide the plurality of LF images 410 into an LF image 410-L representing a left viewpoint (or an array position on the left) and an LF image 410-R representing a right viewpoint (or an arrangement position on the right).

For example, if the plurality of LF images 410 are LF images of 10×5, the LF image 410-L representing the left viewpoint may be an LF image of 5×5 (i.e., LF image of (1,1) to (5,5)) located on the left, and the LF image 410-R representing the right viewpoint may be an LF image of 5×5 (i.e., the LF image of (6,1) to (10, 5)) located on the right side.

The display apparatus 100 may input the LF image 410-L representing a left viewpoint into a trained factorization model to obtain the L image 420-L1 including the first L image 421-L1 and the second L image 422-L1 as the output of the trained factorization model. The display apparatus 100 may input the LF image 410-R representing a right viewpoint into a trained factorization model to obtain an R image 410-R2 including the first R image 421-R2 and the second R image 422-R2 as the output of the trained factorization model.

The trained factorization model may be an artificial intelligence model trained to obtain the number of images (i.e., a layer stack) corresponding to the number of display panels 111-1 and 111-2 when a plurality of LF images are input. For example, the trained factorization model may be an artificial intelligence model trained to obtain the same two images if the display panels 111-1 and 111-2 are two. The factorization model according to the disclosure may be one of a deep neural network (DNN) model, a non-negative tensor factorization (NTF) model, or a non-negative mathematical factorization (NMF) model. However, this is merely exemplary, and the factorization model may be implemented as at least one of a variety of artificial intelligence models.

The factorization model according to one embodiment of the disclosure may be a different model according to the viewpoint of the image being input and output. The L factorization model (or first factorization model) having the LF image 410-L and L image 420-L1 representing the left viewpoint as input and output data, and the R factorization (or second factorization model) having the LF image 410-R and the R image 420-R2 representing the right viewpoint as input and output data are separate models, and the models may be trained using different input and output data. A specific detail of learning of the factorization model will be described with reference to FIG. 8.

Figure 5A:
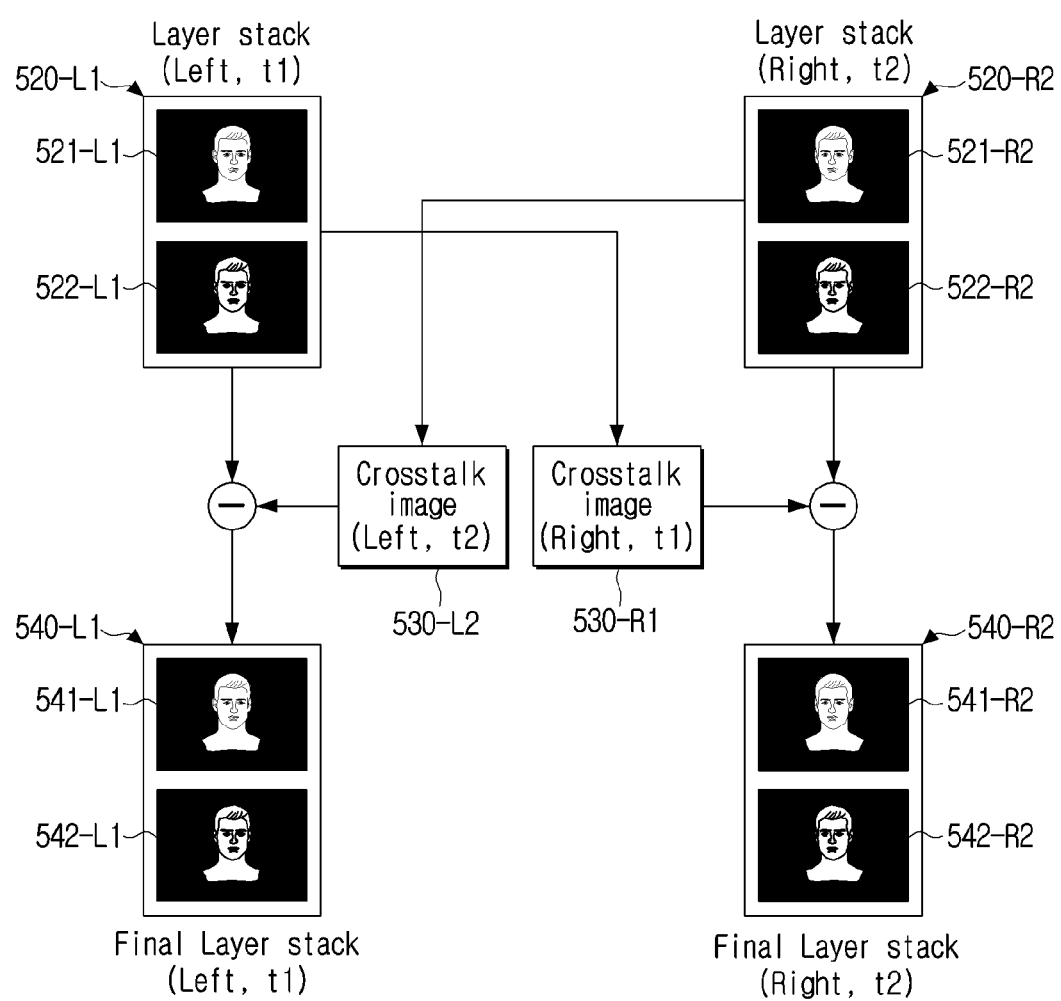
FIGS. 5A, 5B, and 5C are views for illustrating a method of correcting an L image and an R image according to various embodiments of the disclosure.
Figure 5B:
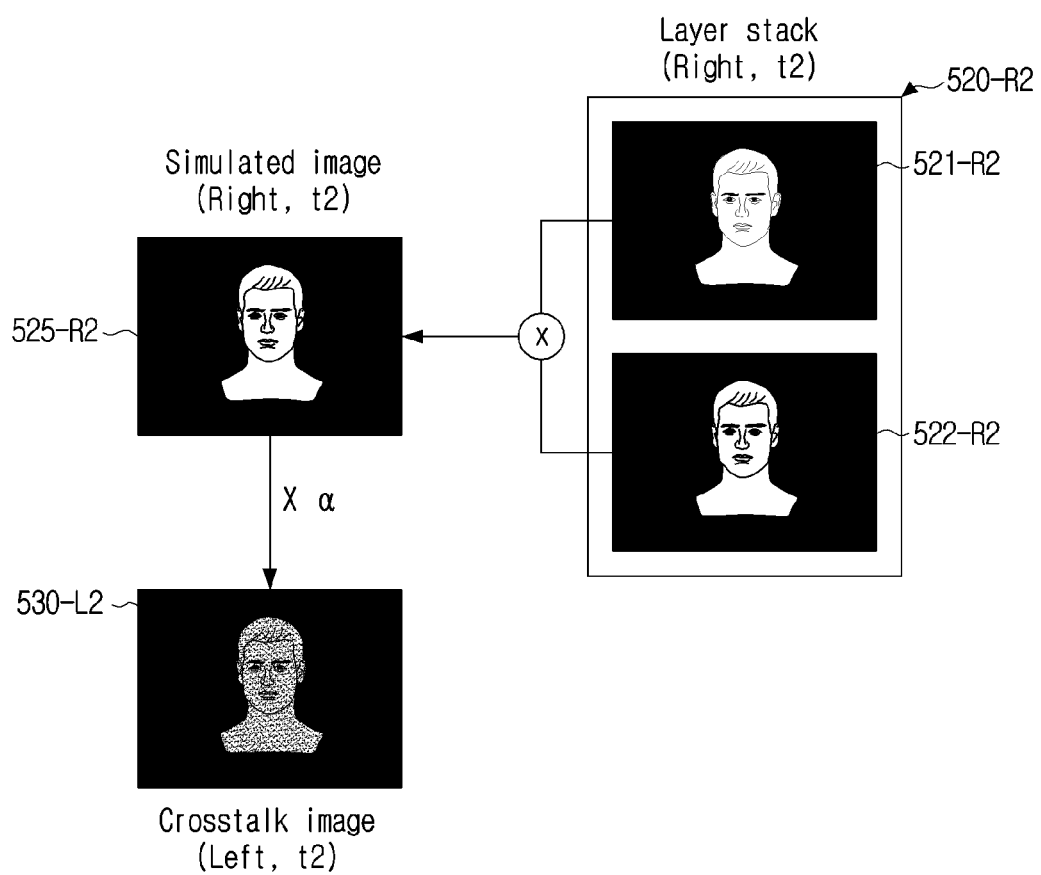
Figure 5C:
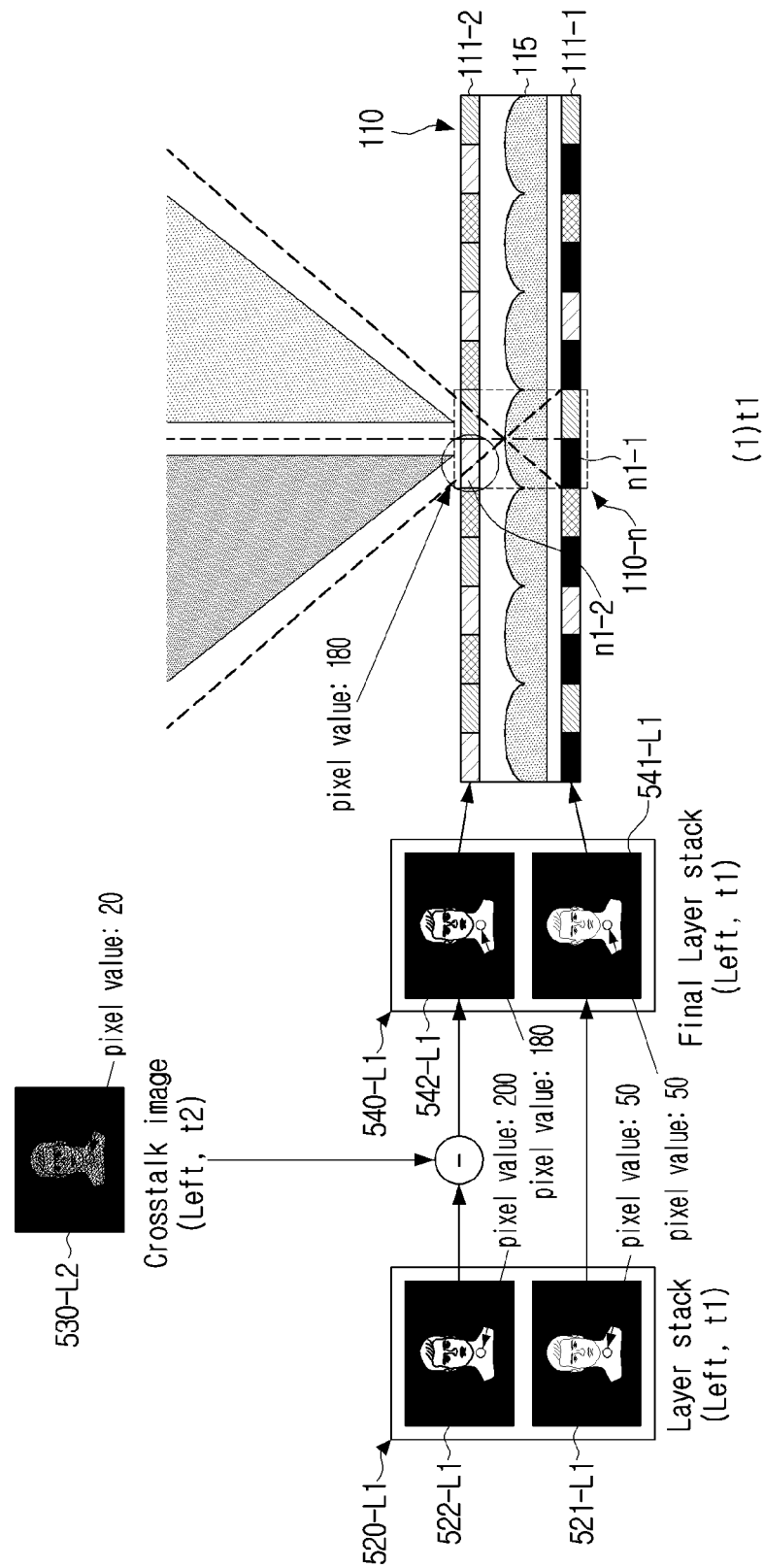

FIGS. 5A to 5C are views for illustrating a method of correcting an L image and an R image according to various embodiments of the disclosure.

Referring to FIG. 5A, the display apparatus 100 may correct a second L image 522-L1 for driving the second display panel 111-2 of the L image 520-L1 on the basis of the first R image 521-R2 for driving the first display panel 111-1 of the R image 520-R2.

In order to correct the second L image 522-L1 representing the left viewpoint, the display apparatus 100 may obtain an R crosstalk image 530-L2 based on the first R image 521-R2 representing the right viewpoint. The R crosstalk image 530-L2 may be a crosstalk image when it is expected that a crosstalk occurs in a left field of view region at a time t2, or a crosstalk image that is observed when a crosstalk occurs in a left field of view region at a time t2.

According to one embodiment, the display apparatus 100 may multiply the pixel value of each pixel of the first R image 521-R2 representing the right viewpoint by a crosstalk ratio (e.g., a value between 0 and 1) to obtain an R crosstalk image 530-L2 having a pixel value.

The crosstalk ratio is the ratio of the brightness observed in the right (or left) field of view region and the brightness observed in the left (or right) field of view region, and may be the experimentally measured value. For example, assuming that the pixel value of the (100, 100) pixel of the first R image 521-R2 to the red color is 50, and the crosstalk ratio is 0.1, the pixel value of the (100, 100) pixel of the R crosstalk image 530-L2 to the red color may be 5 (=50*0.1).

Referring to FIG. 5B, the display apparatus 100 may synthesize the first R image 521-R2 and the second R image 522-R2 representing a right viewpoint, and may obtain the synthesized R image 525-R2. The display apparatus 100 may multiply the pixel values of each pixel of the synthesized R image 525-R2 by a crosstalk ratio (e.g., a value between 0 and 1) to obtain an R crosstalk image 530-L2 having a pixel value.

The display apparatus 100 may obtain the synthesized R image 525-R2 by multiplying the pixel value between the pixels (or the pixel in the propagation route of the light) at the same position as the first R image 521-R2 and the second R image 522-R2. The synthesized R image 525-R2 may refer to an image observed at an external right field of view region when the first R image 521-R2 is displayed on the first display panel 111-1, and the second R image 522-R2 is displayed on the second display panel 111-2.

For example, if it is assumed that a pixel value of the first R image (521-R2) is 100, and a pixel value of the second R image 522-R2 is 200 in related to (50,50) pixel, the display apparatus 100 may normalize the pixel value 100 of the first R image 521-R2 for (50, 50) pixel as (100/255), may normalize the pixel value 200 of the second R image 522-R2 as (200/255), and multiply the maximum value of 255 of the pixel value by the normalized value to calculate the pixel value 78 (=(100/255)*(200/255)*255) of the synthesized image. The number of decimal points may be processed in various ways, such as rounding-off, rounding-down, rounding-up, or the like.

For another example, the R crosstalk image 530-L2 may be an image actually observed in an external left field of view region by an apparatus for measuring brightness when the first R image 521-R and the second R image 522-R2 representing the right viewpoint are displayed.

The display apparatus 100 may correct the second L image 522-L1 using the R crosstalk image 530-L2, and obtain the corrected second L image 542-L1.

Referring to FIG. 5C, the display apparatus 100 may perform a correction by subtracting the pixel value 20 of the R crosstalk image 530-L2 from a pixel value 200 of the second L image 522-L1 for a pixel of the same location and color (i.e., a sub-pixel at the same location) to obtain a second L image 542-L1 corrected so that a pixel with the same location and color has pixel value 180. The display apparatus 100 may not perform correction on the first L image 521-L1. The pixel value of the first L image 521-L1 may be maintained at 50 as before the correction.

The display apparatus 100 may obtain an L crosstalk image 530-R1 based on the first L image 521-L1 for driving the first display panel 111-1 among the L image 520-L1. The L crosstalk image 530-R1 may be a crosstalk image when the occurrence of crosstalk is expected in the right field of view region at time t1, or may be a crosstalk image observed when crosstalk actually occurs. The display apparatus 100 may calibrate the second R image 522-R2 using the L crosstalk image 530-R1, and obtain the calibrated second R image 542-R2. A detail will be omitted to avoid redundancy.

Figure 6:
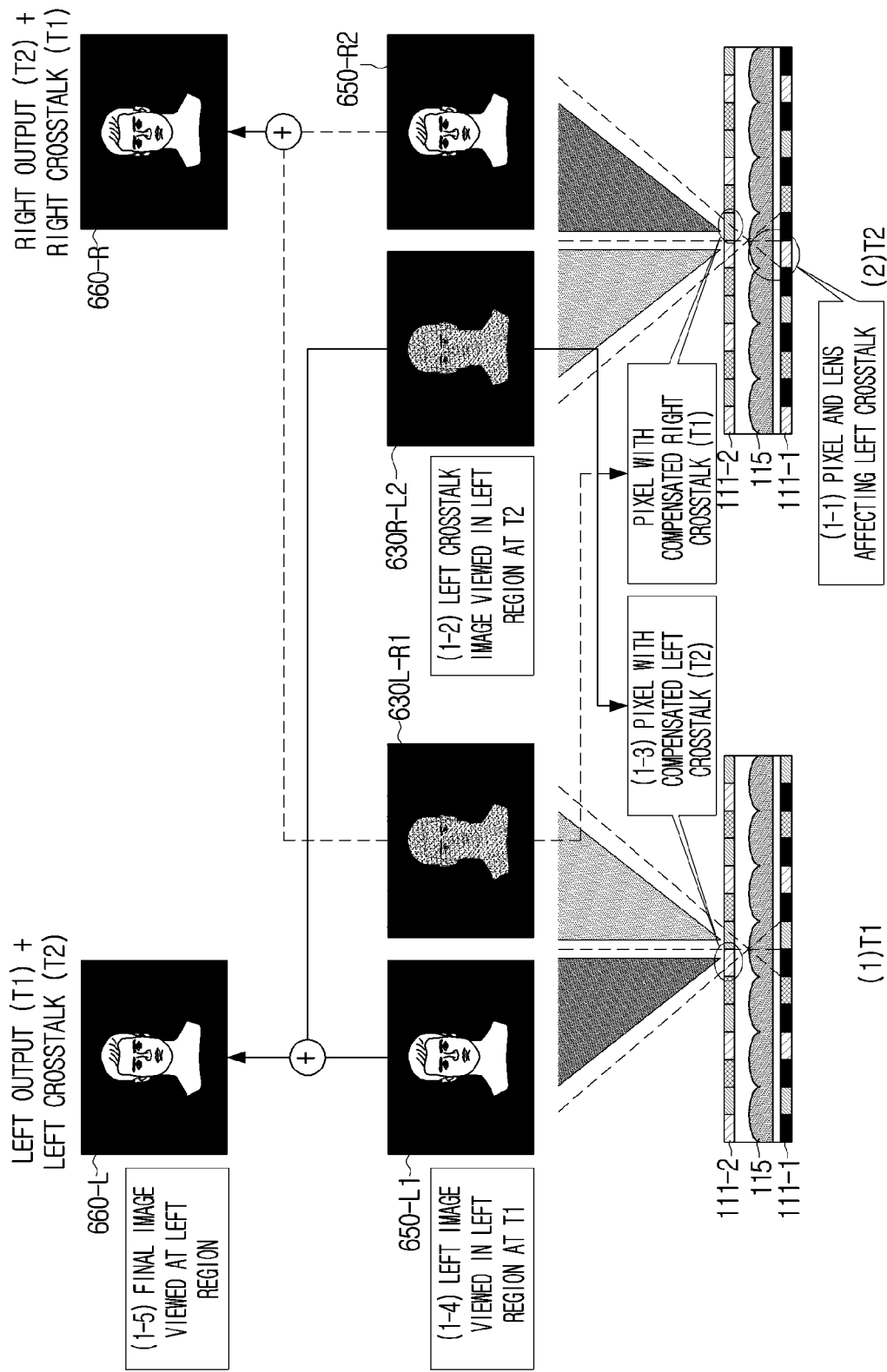
FIG. 6 is a view for illustrating a stereoscopic image observed when a display apparatus displays a corrected L image and an R image according to an embodiment of the disclosure.

FIG. 6 is a view for illustrating a stereoscopic image observed when a display apparatus displays a corrected L image and an R image according to an embodiment of the disclosure.

Referring to FIG. 6, the display apparatus 100 may display a stereoscopic image on the display 110 by driving the display 110 by time-multiplexing based on the L image 540-L1 in which the second L image 522-L1 have been corrected and the R image 540-R2 in which the second R image 522-R2 have been corrected.

In detail, the first display panel 111-1 may display the first L image 521-L1, 541-L1 at time t1, and the second display panel 111-2 may display the corrected second L image 542-L1 at time t1. The first display panel 111-1 may display the first R image 521-R2, 541-R2 at time t2, and the second display panel 111-2 may display the corrected second R image 542-R2 at time t2.

An L-stereoscopic image 650-L1 in which the first L image 521-L1, 541-L1 and the corrected second L image 542-L1 are combined at a time t1 in the left field of view region may be observed, and an R crosstalk image 630R-L2 may be observed at a time t2 in the left field of view region. Since the L-stereoscopic image 650-L1 at time t1 and the R crosstalk image 630R-L2 at time t2 are sequentially and repeatedly displayed for a very short period of time, a user located in the left field of view region may recognize the images as one final stereoscopic image 660-L.

An R stereoscopic image 650-R2 in which the first R image 521-R2, 541-R2 and the corrected second R image 542-R2 are combined at a time t2 in the right field of view region may be observed, and a L crosstalk image 630L-R1 may be observed at a time t1 in the right field of view region. Since the R stereoscopic image 650-R2 at time t2 and the L crosstalk image 630L-R1 at time t1 are sequentially and repeatedly displayed for a very short period of time, a user located in the right field of view region may recognize the images as one final stereoscopic image 660-R.

As described above, the display apparatus 100 according to an embodiment of the disclosure may perform a correction to reduce the brightness of the L image (or the R image) displayed on the left field of view region (or the right field of view region) at time t1 (or time t2) as much as the brightness of the R crosstalk image 630R-L2 (or the L crosstalk image 630L-R1) that may be observed in the left field of view region (or the right field of view region) at time t2 (or time t1). When the display apparatus 100 sequentially displays the corrected image and the crosstalk image for a very short period of time, a user may recognize the images as one natural stereoscopic image, and consequently, there is an effect of reducing the crosstalk, such as the case where the crosstalk is not generated.

Figure 7A:
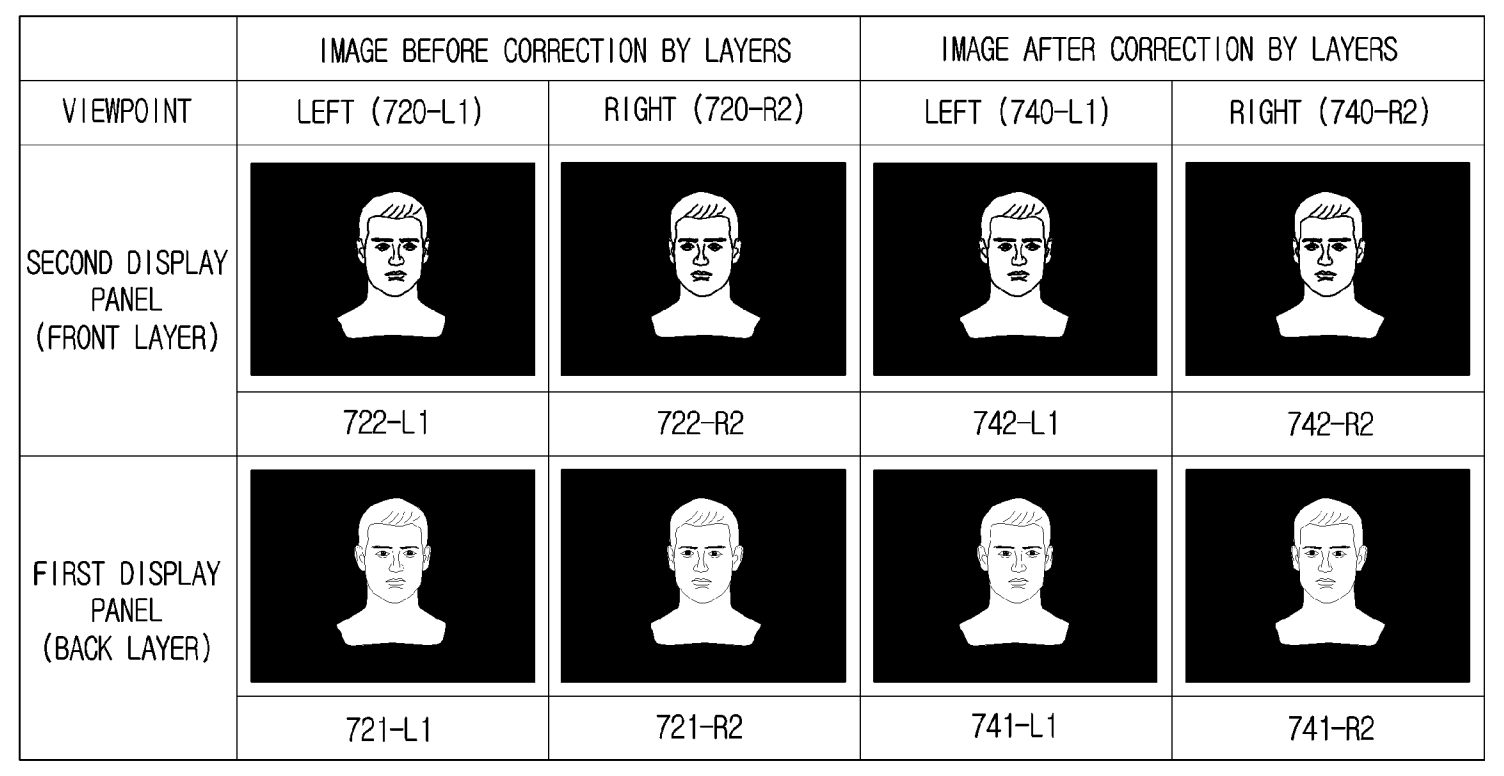

FIGS. 7A and 7B are views for comparing images before and after correction according to various embodiments of the disclosure.

In the table of FIG. 7A, a row refers to an image (that is, images by display panels) displayed on the display panel, and a column refers to an L image of a left viewpoint before correction 720-L1, an R image of a right viewpoint before correction 720-R2, an L image of a left viewpoint after correction 740-L1 and an R image of a right viewpoint after correction 740-R2.

In the second display panel 111-2 according to an embodiment of the disclosure, a second L image 722-L1 displayed at time t1 may be corrected on the basis of the first R image 721-R2 displayed at the time t2 in the first display panel 111-1, so that the final second L image 742-L1 may be obtained. In the second display panel 111-2, the second R image 722-R2 displayed at the time t2 may be corrected on the basis of the first L image 721-L1 displayed at the time t1 in the first display panel 111-1, so that the final second R image 742-R2 may be obtained. A detail thereof will be omitted to avoid redundancy.

In this example, if the second L image 722-L1 and the corrected final second L image 742-L1 are compared with respect to the same position (i.e., a pixel), the brightness of the final second L image 742-L1 may be darker than the second L image 722-L1. The pixel value of the final second L image 742-L1 may be lower than the pixel value of the second L image 722-L1. When the second R image 722-R2 and the corrected final second R image 742-R2 are compared with respect to the same position (i.e., pixel), the brightness of the final second R image 742-R2 may be darker than the second R image 722-R2. The pixel value of the final second R image 742-R2 may be lower than the pixel value of the second R image 722-R2. This is the result of the brightness (or pixel value) of the crosstalk image being reflected in the second L image and the second R image.

FIG. 7B illustrates a stereoscopic image 770 before correction and a stereoscopic image 780 after correction.

The uncorrected L stereoscopic image 775-L is a stereoscopic image which is displayed as overlapped in the left viewpoint region when an L image that is not corrected is displayed at time t1 and the non-corrected R image is displayed at t2 on each of the display panels 111-1 and 111-2. The corrected L-stereoscopic image 785-L is a stereoscopic image that is displayed to be overlapped in an external left viewpoint region when the corrected L image is displayed at time t1 and the corrected R image is displayed at t2 on each of the display panels 111-1, 111-2.

In the similar manner, the uncorrected R stereoscopic image 775-R is a stereoscopic image that is displayed to be overlapped in an external right viewpoint region when the uncorrected L image is displayed at time t1 and the uncorrected R image is displayed at t2 on each of the display panels 111-1, 111-2. The corrected R stereoscopic image 785-R is a stereoscopic image that is displayed to be overlapped in an external right viewpoint region when the corrected L image is displayed at time t1 and the corrected R image is displayed at t2 on each of the display panels 111-1, 111-2.

When comparing an image before correction and after correction by referring to FIG. 7B, the L-stereoscopic image 785-L after correction shows increase in the peak signal-to-noise ratio (PSNR) from 31.7497 to 39.2026 compared to the uncorrected L stereoscopic image 775-L before correction, and the R stereoscopic image 785-R after correction shows increase in the maximum signal-to-noise ratio from 32.2422 to 39.3431 compared to uncorrected R stereoscopic image 775-R before correction. The PSNR refers to evaluating the loss information of the image quality of the two images, and the greater the value of the image, and the better the image quality. According to an embodiment, the corrected image shows increase in the PSNR compared to before correction, and this shows less loss and better quality compared to before correction.

Figure 8:
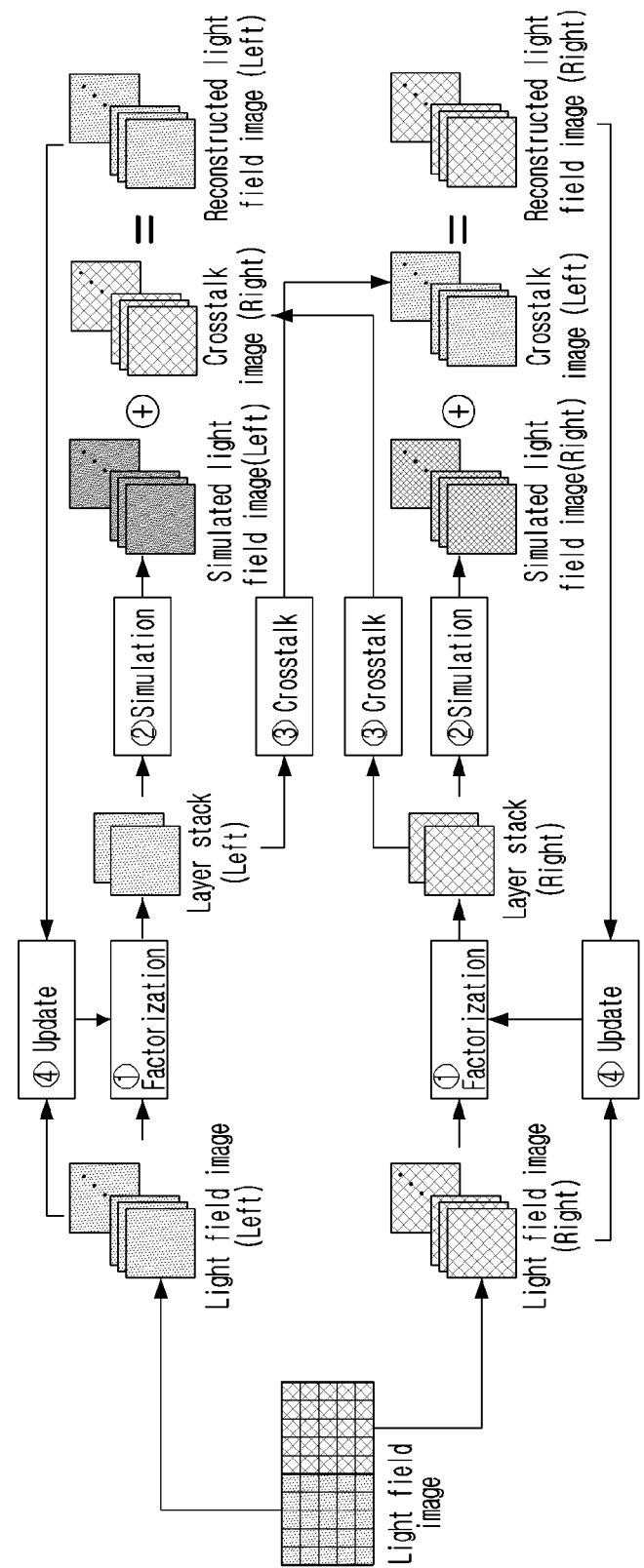
FIG. 8 is a diagram illustrating a method of learning a factorization model according to an embodiment of the disclosure.

FIG. 8 is a diagram illustrating a method of learning a factorization model according to an embodiment of the disclosure.

Referring to FIGS. 4 and 8, first, an L-factorization model (or a first factorization model) will be first described. The L factorization model may be an artificial intelligence model trained to output an L image 420-L1 corresponding to the number of the display panels 111-1 and 111-2 of the display 110 in the LF image 410-L representing the left viewpoint among the plurality of LF images 410. The L-factorization model may use the LF image 410-L representing the left viewpoint as the input data and the L image 410-L1 as the output data.

The display apparatus 100 may divide a plurality of LF images 410 into the LF image 410-L representing a left viewpoint and an LF image 410-R representing a right viewpoint.

The display apparatus 100 may extract a plurality of LF images 410-L representing a left viewpoint from among a plurality of LF images 410, and input the extracted plurality of LF images 410-L into an untrained L-factorization model (or an L-factorization model under training) to obtain the L image 420-L1. The L image 420-L1 may include the first L image 421-L1 and the second L image 422-L1 having the equal number of the number (e.g., two) of the display panels 111-1 and 111-2.

The display apparatus 100 may restore a plurality of LF images representing a left viewpoint on the basis of the first L image 421-L1 and the second L image 422-L1 included in the L image 420-L1. The restored LF image may be an LF image that is viewed at an external specific viewpoint (or predicted to be viewed) when the first display panel 111-1 displays the first L image 421-L1 and the second display panel 111-2 displays the second L image 422-L1 through an actual or virtual simulation.

A shifting parameter of an image displayed on each of the display panels 111-1 and 111-2 may be mapped for each viewpoint. For example, assuming that the display panels 111-1 and 111-2 are two, a shifting parameter of an image displayed on the first display panel 111-1 and a shifting parameter of an image displayed on the second display panel 111-2 may be mapped with respect to each viewpoint, for example, a lower left viewpoint may be mapped to a shifting parameter in a manner such as (0, 0), an intermediate viewpoint (Cx, Cy), and an upper right viewpoint as (2Cx, 2Cy), or the like. However, this is merely exemplary and various modifications are possible.

In this case, the shifting parameter according to the viewpoint may be applied to the first L image 421-L1, and the second L image 422-L1 to restore the LF image. That is, the position of the first L image 421-L1 may be adjusted by applying the shifting parameter mapped to the first L image 421-L1 with respect to a particular viewpoint, and the position of the second L image 422-L1 may be adjusted by applying the shifting parameter mapped to the second L image 422-L1 to multiply the pixel values of the pixels at the same location with each other. At this time, normalization may be performed. Through this process, the display apparatus 100 may restore the LF image of the corresponding viewpoint.

The trained first factorization model may be trained until a loss function based on the restored LF image through the L image 420-L1 and the LF image 410-L representing the left viewpoint may become less than or equal to a preset value. The loss function is an index indicating a current learning state (or current performance) of the factorization model, and may train a model for performing factorization on the basis of a loss function.

Specifically, the display apparatus 100 may obtain a loss function by comparing a plurality of LF images 410-L representing a left viewpoint input as a source image and a plurality of restored LF image images representing a left viewpoint. For example, a method for obtaining a loss function may include a mean squared error method for calculating a loss function by using a mean squared error; a structural similarity index (SSIM) method for calculating the loss function by measuring quality of an image, an L1 norm method for calculating a loss function by measuring least absolute deviations or least absolute errors, and an L2 norm method for calculating a loss function using least squares error, or the like. However, the method is not limited thereto, and a loss function may be obtained by using the above-described method in combination or by other methods.

The L-factorization model may be trained until the loss function is below a predetermined value, and the weight (or parameter) of the L-factorization model according to the learning may be adjusted and updated. The L-factorization model may be trained in a direction that the loss function decreases.

The factorization model according to an embodiment may be trained based on a plurality of LF images synthesized with a crosstalk image of a different viewpoint in a restored plurality of LF images. For example, in the case of an L-factorization model, a crosstalk image representing a right viewpoint is synthesized with a plurality of restored LF images representing a left viewpoint, and a loss function is obtained by comparing a plurality of LF images 410-L representing a left viewpoint and a synthesized plurality of LF image images, and an L-factorization model may be trained in a direction in which a loss function decreases.

Even in the case of an R factorization model using the LF image 410-R and the R image 420-R2 representing the right viewpoint input/output data, it may be trained in a manner similar to that described above. In other words, the display apparatus 100 may obtain a loss function by comparing a plurality of LF images 410-R representing a right viewpoint input to a source image and a plurality of restored LF images representing a right viewpoint, and the R factorization model may be trained in a direction in which a loss function decreases. The weight (or parameter) of the R factorization model may be updated based on a loss function.

Even in this case, the factorization model may be trained based on a plurality of LF images in which the crosstalk of another viewpoint is synthesized with the plurality of restored LF images. By synthesizing a crosstalk image representing a left viewpoint with a plurality of restored LF images representing a right viewpoint, and comparing a plurality of LF images 410-R representing a plurality of synthesized LF images and a right viewpoint to obtain a loss function, and an R factorization model may be trained in a direction in which a loss function decreases.

In the above embodiment, the display apparatus 100 performs a time-multiplexing operation for two L image and R image alternately, but this is merely exemplary, and a time-multiplexing operation may be performed alternately with the images classified as various viewpoints.

According to an embodiment, the display apparatus 100 may obtain an L image, an M image, and an R image corresponding to a viewpoint on the basis of an LF image which is obtained by a plurality of LF images being classified according to a viewpoint. The L image, M image, and R image may be obtained through a factorization model corresponding to each viewpoint in the plurality of LF image images. The learning of the factorization model will be described with reference to FIG. 9.

The L image may be an image representing a left viewpoint that may be observed in a left field of view region (e.g., −30 degrees to −10 degrees), and the M image is an image representing an intermediate viewpoint that may be observed in an intermediate field of view region (e.g., −10 degrees to 10 degrees), and the R image may be an image representing a right viewpoint that may be observed in a right field of view region (e.g., +10 degrees to +30 degrees). The M image may include a first M image for driving the first display panel 111-1 and a second M image for driving the second display panel 111-2. The crosstalk may occur by the adjacent L image and the R image in the case of the M image, and the display apparatus 100 of the disclosure may perform the following operations to reduce such crosstalk.

The display apparatus 100 may correct the second L image based on the first M image and the first R image.

The display apparatus 100 may obtain an M-crosstalk image by multiplying a pixel value of a first M image (or an image in which the first M image and a second M image are combined) by a crosstalk ratio, and then multiply a pixel value of the first R image (or an image in which the first R image and the second R image are combined) by a crosstalk ratio to obtain an R-crosstalk image. The display apparatus 100 may correct the second L image to have a pixel value that is reduced by the pixel value of the R-crosstalk image.

The display apparatus 100 may calibrate the second R image based on the first M image and the first L image. The display apparatus 100 may calibrate the second M image based on the first L image and the first R image. The specifics shall be omitted in that there is redundancy with the method of calibrating the above-described second L image.

The display apparatus 100 may display a stereoscopic image by driving the display 110 by time-multiplexing based on the L image in which the second L image is corrected, the M image in which the second M image is corrected, and the R image in which the second R image is corrected.

For example, the display apparatus 100 may drive the display 110 to display the corrected L image at time t1, drive the display 110 to display the corrected M image at time t2, and drive the display 110 to display the corrected R image at time t3. The display apparatus 100 may be alternately displayed according to time such as t1, t2, t3, t1, t2, . . . .

As described above, the display apparatus 100 has an effect of reducing crosstalk which is similar to a case in which a crosstalk is not generated by a time-multiplexing operation by compensating for the brightness of a crosstalk image generated in a region adjacent to each other.

Figure 9:
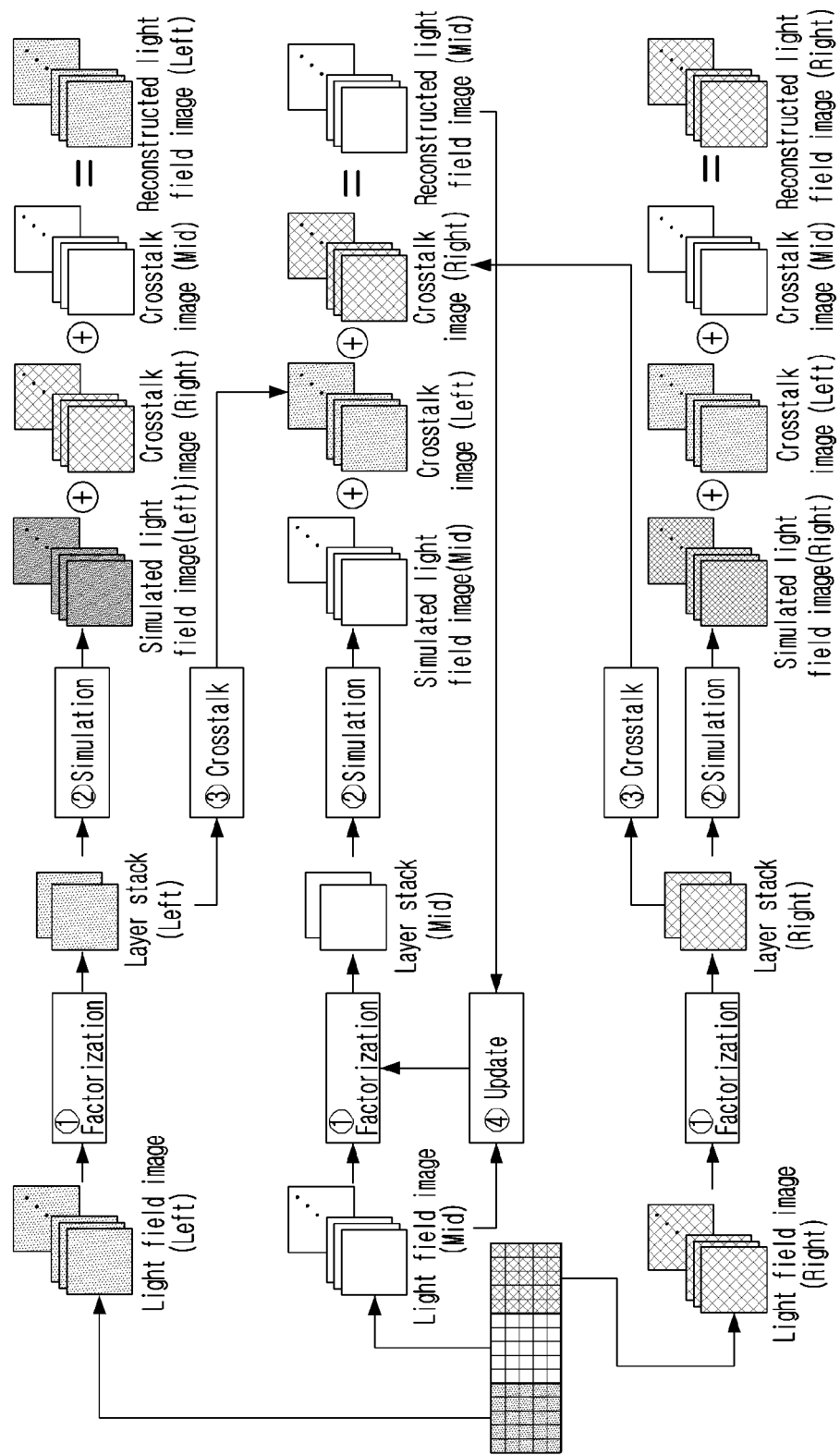
FIG. 9 is a diagram illustrating a method of learning a factorization model according to the number of divided viewpoints according to an embodiment of the disclosure.

FIG. 9 is a diagram illustrating a method of learning a factorization model according to the number of divided viewpoints according to an embodiment of the disclosure.

Referring to FIG. 9, a plurality of LF images may be classified into a left viewpoint, an intermediate viewpoint, and a right viewpoint according to a viewpoint. Hereinafter, a method of learning an M-factorization model corresponding to an intermediate viewpoint will be described.

The display apparatus 100 may input an LF image of an intermediate viewpoint to an M factorization model trained to output an L image 420-L1 corresponding to the number of display panels 111-1 and 111-2 of the display 110, thereby obtaining an M image as an output. In this example, the M image may include a first M image and a second M image of the same number as the number of the display panels 111-1 and 111-2.

The display apparatus 100 may restore a plurality of LF images representing an intermediate viewpoint on the basis of the first M image and the second M image included in the M image. When the first display panel 111-1 displays the first M-image through a real or virtual simulation, and the second display panel 111-2 displays the second M-image, the restored LF image may be an LF image that appears at an external specific viewpoint (or predicted to appear).

The display apparatus 100 may obtain an image obtained by synthesizing an LF image restored through the M image and an image in which the L crosstalk image and the R crosstalk image are synthesized. In the case of the L-crosstalk image, as described above, when the LF image representing the left viewpoint among the plurality of LF images is input to the L factorization model, the L crosstalk image may be obtained by multiplying the crosstalk ratio to the output L image. The R crosstalk image may be obtained by multiplying the crosstalk ratio with an R image which is output when the LF image representing the right viewpoint, among a plurality of LF images, is input to the R factorization. The synthesized image may be an image in which the pixel values of each image for a pixel at the same location are summed.

The first factorization model may also be trained until a loss function based on the LF image representing the synthesized image and the intermediate viewpoint is less than or equal to a predetermined value. The L and R factorization models corresponding to different viewpoints may be applied in the same manner, and thus, a duplicate description thereof will be omitted.

Figure 10:
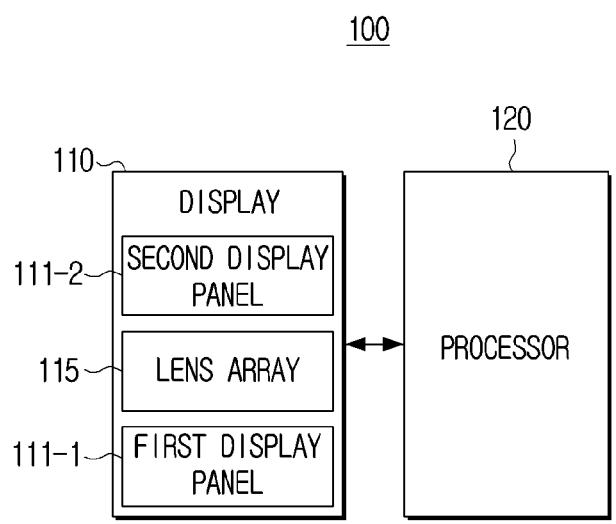
FIG. 10 is a block diagram illustrating a display apparatus according to an embodiment of the disclosure.

FIG. 10 is a block diagram illustrating a display apparatus according to an embodiment of the disclosure.

Referring to FIG. 10, the display apparatus 100 according to an embodiment may include the display 110 and the processor 120.

The display 110 may include a plurality of display panels 111-1 and 111-2. The plurality of display panels 111-1 and 111-2 may be arranged to be parallel to each other, and may be stacked in a direction perpendicular to the surface of the display panels 111-1 and 111-2. Each of the plurality of display panels 111-1 and 111-2 may include a plurality of pixels. Each pixel includes a plurality of sub-pixels, each sub-pixel being capable of adjusting the degree of light emitted by the driving circuit.

The display 110 may include a lens array 115. The lens array 115 may be disposed between the plurality of display panels 111-1 and 111-2. For example, the lens array 115 may be disposed on the first display panel 111-1. The lens array 115 may include a plurality of unit lenses, and each unit lens may refract light emitted through a sub-pixel (or pixel) of the first display panel 111-1 to change a direction in which light propagates. The number of the plurality of display panels may be variously modified, and in this case, the plurality of display panels may be arranged in a stacked structure as described above. For example, the plurality of display panels may include a first display panel 111-1 and a second display panel 111-2, . . . , the nth display panel (n is a natural number of 3 or more). In this case, the lens array 115 may be disposed between the first display panel 111-1 and the second display panel 111-2. In another embodiment, the lens array 115 may be disposed between the second display panel 111-2 and the third display panel. In this manner, the lens array 115 may be disposed between the n-lth display panel and the nth display panel (n is a natural number greater than or equal to 4).

The processor 120 may control the overall operation of the display apparatus 100. The processor 120 may be implemented as a general purpose processor such as a central processing unit (CPU), an application processor (AP), a graphics-only processor such as a graphics processing unit (GPU), a vision processing unit (VPU), etc., an artificial intelligence dedicated processor such as a neural network processing unit (NPU), and the like. The processor 120 may also include volatile memory for loading at least one instruction or module. The processor 120 may include a random access memory (RAM), a read-only memory (ROM), a graphics processor, a main central processing unit (CPU), a first through Nth interface, and a bus. The RAM, ROM, a graphic processing unit (not shown), a main CPU (not shown), a first through Nth interface (not shown), and the like may be connected to each other through a bus (not shown).

The processor 120 may control the operation of the display apparatus 100 as described above.

The processor 120 may obtain an L image 320L and an R image 320R for driving the display 110 by time-multiplexing based on a plurality of light field (LF) images 310. The processor 120 may correct a second L image for driving the second display panel 111-2 of the L image 320L based on a first R image for driving the first display panel 111-1 among the R image 320R. The display apparatus 100 may correct a second R image for driving the second display panel 111-2 among the R image 320R based on the first L image for driving the first display panel 111-1 among the L image 320L. The processor 120 may display the stereoscopic image by driving the display 110 by time-multiplexing on the basis of an L image 340L in which the second L image is corrected and an R image 340R in which the second R image is corrected.

As described above, the processor 120 may control the operation of the display apparatus 100 or other components included by the display apparatus 100, and the detailed description thereof is omitted.

The display apparatus 100 may further include at least one of various configurations such as a memory, a communicator, and an input interface.

The memory may store various information. For example, various instructions, operational system (OS), application programs, or data required for the operation of the display apparatus 100 or the processor 120 may be stored in the memory. The memory may be implemented as a volatile memory such as a static random access memory (S-RAM), a dynamic random access memory (D-RAM), an erasable programmable read-only memory (EPROM), a non-volatile memory such as a flash memory, a read only memory (ROM), an erasable programmable read only memory (EEPROM), an electrically erasable programmable read only memory (EEPROM), a hard disk drive (HDD), or a solid state drive (SSD), or the like. The memory may be accessed by the processor 120, and data reading/writing/modifying/deleting/updating, or the like, by the processor 120 may be performed.

The communicator may communicate with an external device to transmit or receive data with an external device. For example, the communicator may perform at least one wireless communication among a variety of methods such as cellular communication using at least one of long-term evolution (LTE), LTE advance (LTE-A), code division multiple access (CDMA), wideband CDMA (WCDMA), universal mobile telecommunications system (UMTS), Wireless Broadband (WiBro), or global system for mobile communications (GSM), or the like, wireless fidelity (WiFi), Bluetooth, bluetooth low energy (BLE), zigbee, near field communication (NFC), or the like. The communicator may perform at least one of a variety of methods such as a universal serial bus (USB), a high definition multimedia interface (HDMI), a digital visual interface (DVI), a Thunderbolt, an Ethernet, a universal serial bus (USB) port, a lighting, etc.

The input interface may receive various user commands. The input interface may transmit the received user commands to the processor 120. The input interface may include, for example, a touch panel or a key. The touch panel may be used in relation to, for example, at least one of an electrostatic, a pressure-sensitive, infrared, or ultrasonic manner, and the touch panel may include a control circuit. The touch panel may further include a tactile layer to provide a tactile response to the user. The key may include, for example, a physical button, an optical key, or a virtual keypad coupled with the touch panel.

Figure 11:
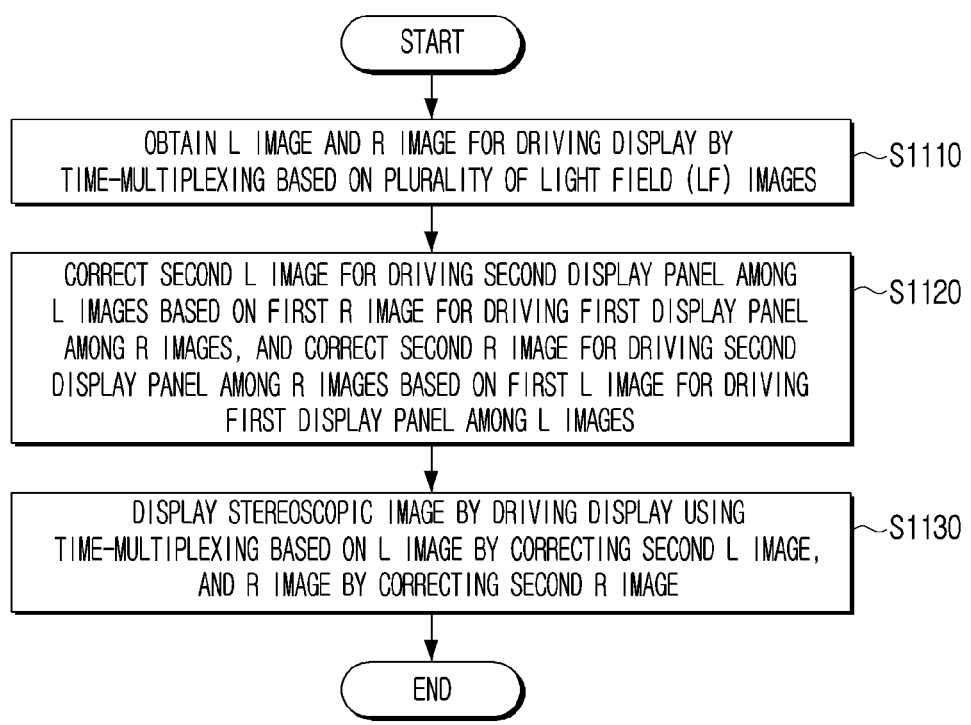
FIG. 11 is a flowchart illustrating a flowchart according to an embodiment of the disclosure.

FIG. 11 is a flowchart illustrating a flowchart according to an embodiment of the disclosure.

Referring to FIG. 11, the control method of the display apparatus 100 according to an embodiment of the disclosure may obtain an L image and an R image for driving the display 110 of the display apparatus 100 by time-multiplexing based on a plurality of light field (LF) images in operation S1110.

The display 110 may include the first display panel 111-1, a lens array 115 disposed on the first display panel 111-1 and the second display panel 111-2 disposed on the lens array 115.

For example, the lens array 115 may include a plurality of unit lenses. Each unit lens may be disposed on an even number of sub-pixels of the first display panel 111-1.

The L image may include a first L image for driving the first display panel 111-1 and a second L image for driving the second display panel 111-2. The R image may include a first R image for driving the first display panel 111-1 and a second R image for driving the second display panel 111-2.

According to an embodiment, based on information on a viewpoint in which a plurality of LF images are captured, an LF image representing a left viewpoint may be extracted from among a plurality of LF images. An L image may be obtained by inputting an extracted LF image representing a left viewpoint to a first factorization model trained to output an L image corresponding to the number of display panels 111-1 and 111-2 of the display 110.

Based on the information on the viewpoint where the plurality of LF images are captured, an LF image representing a right viewpoint among the plurality of LF images may be extracted. In addition, the extracted LF image representing the right viewpoint may be input to the second factorization model trained to output the R image corresponding to the number of the display panels 111-1 and 111-2 of the display 110 to obtain an R image.

The first factorization model may be an artificial intelligence model trained until a loss function based on an LF image representing a left viewpoint and an LF image restored through the L image becomes less than or equal to a predetermined value, and the second factorization model may be an artificial intelligence model trained until a loss function based on an LF image representing a right point of view and an LF image restored through the R image becomes less than or equal to a predetermined value.

Each of the first factorization model and the second factorization model may be one of a deep neural network (DNN) model, a non-negative tensor factorization (NTF) model, or a non-negative matrix factorization (NMF) model.

The second L image for driving the second display panel 111-2 of the L image may be corrected based on the first R image for driving the first display panel 111-1 among the R images. The second R image for driving the second display panel 111-2 among the R images may be corrected based on the first L image for driving the first display panel 111-1 among the L images in operation 51120.

An R-crosstalk image may be obtained based on the first R image. An L-crosstalk image may be obtained on the basis of the first L image.

As an example, the R crosstalk image having a pixel value obtained by multiplying a crosstalk ratio by the pixel value of the first R image may be obtained, and the L crosstalk image having a pixel value obtained by multiplying the crosstalk ratio by the pixel value of the first L image may be obtained.

As another example, an R image (third R image) in which the first R image and the second R image are synthesized may be obtained and the R crosstalk image having a pixel value by multiplying the crosstalk ratio by the pixel value of the synthesized R image may be obtained. An L image (a third L image) in which the first L image and the second L image are synthesized may be obtained and the L crosstalk image having a pixel value obtained by multiplying the crosstalk ratio by the pixel value of the synthesized L image may be obtained. As an example, after performing normalization of dividing a pixel value of two images by a maximum pixel value (e.g., 255), a synthesized image may be obtained by multiplying the pixel values of the same position by a normalized value, multiplying the multiplied value by the maximum pixel value, and using the calculated value as a pixel value. However, this is merely exemplary and an image synthesized in various ways may be obtained.

In this case, the second L image may be corrected on the basis of the pixel value of the R crosstalk image. The second R image may be corrected on the basis of the pixel value of the L crosstalk image. The second L image may be corrected to have a pixel value that is reduced by the pixel value of the R crosstalk image for the pixel at the same position. In addition, the second R image may be corrected to have a pixel value that is reduced by the pixel value of the L crosstalk image for the pixel at the same position.

The display 110 may display a stereoscopic image by driving the display 110 using time-multiplexing based on the L image by correcting the second L image, and the R image by correcting the second R image in operation S1130.

At time t1, the first display panel 111-1 may display the first L image, and the second display panel 111-2 may display the corrected second L-image on the basis of the first R image. At time t2, the first display panel 111-1 may display the first R image, and the second display panel 111-2 may display the corrected second R image based on the first L image. The interval between time t1 and time t2 may be a very short time. For example, the interval between time t1 and time t2 may be within the range of 1 ms or more and 30 ms or less.

As an example, the obtaining of the L image and the R image may include obtaining an L image, an M image, and an R image corresponding to a viewpoint on the basis of an LF image in which a plurality of LF images are classified according to a viewpoint. The correcting may include, based on the first M image and the first L image to drive the first display panel 111-1 of the image, correcting the second L image, based on the first M image and the first L image, correcting the second R image, and based on the first L image and the first R image, correcting the second M image to drive the second display panel 111-2 among the M images. The displaying a stereoscopic image may include displaying a stereoscopic image by driving the display by time-multiplexing based on the L image by correcting the second L image and the R image by correcting the second R image.

Various embodiments may be implemented as software that includes instructions stored in machine-readable storage media readable by a machine (e.g., a computer). A device may call instructions from a storage medium and operate in accordance with the called instructions, including an electronic apparatus (e.g., the display apparatus 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some subcomponents of the sub-components described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
   a display comprising:
      a first display panel comprising a plurality of sub-pixels,
      a lens array disposed on the first display panel and comprises a plurality of unit lens, and
      a second display panel disposed on the lens array; and
   a processor configured to:
      based on a plurality of light field (LF) images, obtain a left (L) image and a right (R) image to drive the display by time-multiplexing,
      correct a second L image to drive the second display panel among L images based on a first R image to drive the first display panel among R images, and correct a second R image to drive the second display panel among the R images based on a first L image to drive the first display panel among the L images, and
      display a stereoscopic image by driving the display by time-multiplexing based on the L image which comprises the corrected second L image and the R image which comprises the corrected second R image,
   wherein the lens array disposed on the first display panel such that respectively unit lens is arranged on a predetermined number of first sub-pixels, and
   wherein the processor is further configured to,
      based on information of a viewpoint at which a plurality of LF images are captured, extract an LF image representing a left viewpoint and an LF image representing a right viewpoint among the plurality of LF images,
      based on the LF image representing the left viewpoint obtain a left (L) images respectively corresponding to the first display panel and the second display panel, and based on the LF image representing the right viewpoint obtain a right (R) images respectively corresponding to the first display panel and the second display panel.

2. The display apparatus of claim 1, wherein the processor is further configured to:
   obtain an R crosstalk image based on the first R image and an L crosstalk image based on the first L image;
   correct the second L image based on a pixel value of the R crosstalk image; and
   correct the second R image based on a pixel value of the L crosstalk image.

3. The display apparatus of claim 2, wherein the processor is further configured to:
   correct the second L image to have a pixel value reduced as much as a pixel value of the R crosstalk image with respect to a pixel of a same position; and
   correct the second R image to have a pixel value reduced as much as a pixel value of the L crosstalk image with respect to a pixel of a same position.

4. The display apparatus of claim 2, wherein the processor is further configured to:
   obtain the R crosstalk image having a pixel value obtained by multiplying a crosstalk ratio by the pixel value of the first R image; and obtain the L crosstalk image having a pixel value obtained by multiplying the crosstalk ratio by the pixel value of the first L image.

5. The display apparatus of claim 2, wherein the processor is further configured to:
obtain a third R image in which the first R image and the second R image are synthesized and obtain the R crosstalk image having a pixel value by multiplying a crosstalk ratio by the pixel value of the synthesized third R image; and
obtain a third L image in which the first L image and the second L image are synthesized and obtain the L crosstalk image having a pixel value obtained by multiplying the crosstalk ratio by the pixel value of the synthesized third L image.

6. The display apparatus of claim 1, wherein the processor is further configured to:
obtain the L image by inputting the LF image representing the left viewpoint to a first factorization model trained to output the L image corresponding to a number of the first display panel and the second display panel; and
obtain the R image by inputting the LF image representing the right viewpoint to a second factorization model trained to output the R image corresponding to a number of the first display panel and the second display panel.

7. The display apparatus of claim 6,
wherein the first factorization model is an artificial intelligence model trained until a loss function based on an LF image representing a left viewpoint and an LF image restored through the L image becomes less than or equal to a predetermined value, and
wherein the second factorization model is an artificial intelligence model trained until a loss function based on an LF image representing a right point of view and an LF image restored through the R image becomes less than or equal to a predetermined value.

8. The display apparatus of claim 6, wherein each of the first factorization model and the second factorization model is one of a deep neural network (DNN) model, a non-negative tensor factorization (NTF) model, or a non-negative matrix factorization (NMF) model.

9. The display apparatus of claim 1, wherein the lens array comprises a unit lens disposed on an even number of sub-pixels of the first display panel.

10. The display apparatus of claim 1, wherein the processor is further configured to:
based on the LF image which are classified according to a viewpoint at which the plurality of LF images are captured, obtain the L image, an M image, and the R image corresponding to the viewpoint;
correct the second L image based on a first M image and the first R image for driving the first display panel among the M images;
correct the second R image based on the first M image and the first L image;
based on the first L image and the first R image, correct a second M image for driving the second display panel among the M images; and
display the stereoscopic image by driving the display by time-multiplexing based on the L image which comprises the corrected second L image, the M image which comprises the corrected second M image, and the R image which comprises the corrected second R image.

11. A controlling method of a display apparatus, the controlling method comprising:
based on a plurality of light field (LF) images, obtaining a left (L) image and a right (R) image to drive a display comprising a first display panel comprising a plurality of sub-pixels, a lens array disposed on the first display panel, and a second display panel disposed on the lens array by time-multiplexing;
correcting a second L image to drive the second display panel among L images based on a first R image to drive the first display panel among R images, and correct a second R image to drive the second display panel among the R images based on a first L image to drive the first display panel among the L images; and
displaying a stereoscopic image by driving the display by time-multiplexing based on the L image which comprises the corrected second L image and the R image which comprises the corrected second R image,
wherein the lens array comprises a plurality of unit lens and is disposed on the first display panel such that respectively unit lens is arranged on a predetermined number of first sub-pixels, and
wherein the lens array disposed on the first display panel such that respectively unit lens is arranged on a predetermined number of the first sub-pixels, and
wherein the obtaining a left (L) image and a right (R) image comprises:
based on information of a viewpoint at which a plurality of LF images are captured, extracting an LF image representing a left viewpoint and an LF image representing a right viewpoint among the plurality of LF images,
based on the LF image representing the left viewpoint obtaining a left (L) images respectively corresponding to the first display panel and the second display panel, and
based on the LF image representing the right viewpoint obtaining a right (R) images respectively corresponding to the first display panel and the second display panel.

12. The method of claim 11, wherein the correcting comprises:
obtaining an R crosstalk image based on the first R image and an L crosstalk image based on the first L image; and
correcting the second L image based on a pixel value of the R crosstalk image, and correcting the second R image based on a pixel value of the L crosstalk image.

13. The method of claim 12, wherein the correcting comprises:
correcting the second L image to have a pixel value reduced as much as a pixel value of the R crosstalk image with respect to a pixel of a same position; and
correcting the second R image to have a pixel value reduced as much as a pixel value of the L crosstalk image with respect to a pixel of a same position.

14. The method of claim 12, wherein the obtaining the R crosstalk image and the L crosstalk image comprises:
obtaining the R crosstalk image having a pixel value obtained by multiplying a crosstalk ratio by the pixel value of the first R image; and
obtaining the L crosstalk image having a pixel value obtained by multiplying the crosstalk ratio by the pixel value of the first L image.

15. The method of claim 12, wherein the obtaining the R crosstalk image and the L crosstalk image comprises:
obtaining a third R image in which the first R image and the second R image are synthesized and obtain the R crosstalk image having a pixel value by multiplying a crosstalk ratio by the pixel value of the synthesized third R image; and obtaining a third L image in which the first L image and the second L image are synthesized and obtain the L crosstalk image having a pixel value obtained by multiplying the crosstalk ratio by the pixel value of the synthesized third L image.

16. The method of claim 12, wherein the plurality of LF images representing the left viewpoint are restored based on the first L image and the second L image included in the L image.

17. The method of claim 16, wherein the restored LF image is an LF image that is viewed at an external specific viewpoint when a first display panel displays the first L image and a second display panel displays the second L image through an actual image or a virtual simulation.

18. The method of claim 17, wherein a shifting parameter of an image displayed on each of the first display panel and the second display panel is mapped for each viewpoint.

* * * * *